(12) United States Patent
Bielak

(10) Patent No.: US 7,431,360 B1
(45) Date of Patent: Oct. 7, 2008

(54) PORTABLE ANIMAL WASTE REMOVER

(76) Inventor: Kenneth Bielak, 5906 N. Merrimac, Chicago, IL (US) 60646

(*) Notice: Subject to any disclaimer, the term of this patent is extended or adjusted under 35 U.S.C. 154(b) by 0 days.

(21) Appl. No.: 11/656,252

(22) Filed: Jan. 22, 2007

(51) Int. Cl.
  *A01K 29/00* (2006.01)
  *E01H 1/12* (2006.01)
(52) U.S. Cl. ...................................................... 294/1.5
(58) Field of Classification Search ................. 294/1.3, 294/1.4, 1.5, 19.1, 57, 55; 209/418
  See application file for complete search history.

(56) References Cited

U.S. PATENT DOCUMENTS

| | | | |
|---|---|---|---|
| 1,007,202 A * | 10/1911 | Hollinshed | 209/419 |
| 3,804,448 A * | 4/1974 | Schmieler | 294/1.4 |
| 4,017,015 A | 4/1977 | Jefferson | |
| 4,042,269 A * | 8/1977 | Skermetta | 294/1.5 |
| 4,146,260 A | 3/1979 | Carrington | |
| 4,194,777 A | 3/1980 | Carns | |
| D262,943 S | 2/1982 | Schadler | |
| 4,483,560 A | 11/1984 | Lordi | |
| 4,500,125 A * | 2/1985 | Olson | 294/1.4 |
| 4,640,540 A * | 2/1987 | Chisholm | 294/55 |
| D316,315 S | 4/1991 | Elrod | |
| 5,039,148 A | 8/1991 | Brautovich | |
| 5,269,575 A | 12/1993 | Parvaresh | |
| 5,365,632 A * | 11/1994 | Kirchnavy | 15/257.3 |
| D363,653 S * | 10/1995 | Tisbo et al. | D8/10 |
| 5,502,871 A * | 4/1996 | Reyes | 15/257.1 |
| 5,536,055 A | 7/1996 | Kohn | |
| 5,564,762 A | 10/1996 | Ring | |
| 5,580,111 A | 12/1996 | Bohn | |
| 5,718,469 A | 2/1998 | Ockerman | |
| 5,741,036 A | 4/1998 | Ring | |
| D409,804 S * | 5/1999 | Nunes | D30/162 |
| 5,951,078 A * | 9/1999 | Whitehead et al. | 294/54.5 |
| 5,971,452 A * | 10/1999 | Marymor et al. | 294/1.5 |
| D418,261 S | 12/1999 | Betts et al. | |
| 6,003,915 A * | 12/1999 | Bierman | 294/51 |
| D427,392 S * | 6/2000 | Mousser | D30/162 |
| 6,478,351 B1 * | 11/2002 | Nelson | 294/1.4 |
| D483,159 S | 12/2003 | Boyd | |
| 6,820,628 B2 * | 11/2004 | Larson | 135/66 |

OTHER PUBLICATIONS

Initial Prototype, Exhibit A, attached sheets, no date.

* cited by examiner

*Primary Examiner*—Dean J Kramer
(74) *Attorney, Agent, or Firm*—Adrienne B. Naumann

(57) ABSTRACT

Described herein is a portable animal waste remover with an elongated handle, or two handle components attached to a tapered scoop. The tapered scoop easily fits between an animal's hind legs prior to that animal's defecation. The scoop can contain a notch into which the edges or handles of a disposable bag insert. The bag thereby acts as a liner for the scoop and traps the waste from the animal. The user removes the uppermost edges of the bag from the slot and removes the bag from the curved scoop while retaining the waste within the bag. In other embodiments the elongated handle has an adjustable handle length extension, comprises a wheel, or fits within the user's pocket.

4 Claims, 21 Drawing Sheets

PORTABLE ANIMAL WASTE REMOVER

BACKGROUND OF THE INVENTION

My invention relates to a portable device which is positioned under an animal while it defecates. The animal waste falls directly into a bag and is captured within without the person bending towards the ground, a litter box, or the collected waste. More particularly, my invention relates to a portable device fashioned as a scoop with a long handle. When an animal, such as a dog, defecates the scoop portion is slipped beneath the animal's posterior to hold the falling waste. The waste lands within a bag which wraps the curved scoop. The bag is then removed from the scoop portion in a manner which encloses the waste within the bag. The waste retrieval occurs without the person bending towards the ground, the person need not touch the waste, and the device need not be cleaned after every use.

The prior art field of devices for retrieval of animal waste discloses that these devices do not prevent the person from bending towards the ground or litter box, to retrieve the waste. The person must also carry the device in one hand, which leaves only one hand free for a leashed pet, or perhaps more than one animal. These two problems cause sufficient inconvenience and discomfort, so pet owners avoid these devices with which the tiresome process of "walking the dog" becomes more burdensome.

U.S. Design Pat. No. D483,159 S (Boyd) discloses an ornamental design for an animal waste scoop and bag combination. U.S. Design Pat. No. 316,315 (Elrod) discloses an ornamental design for an animal waste scoop, but there is no removable bag component.

U.S. Des. Pat. 418,261 (Betts et al.) also discloses an ornamental design for a scoop for dog waste. U.S. Design Pat. 262,943 (Schadler) discloses an ornamental design for a combined scoop and container for animal waste. There is no handle or detachable bag. None of the above designs include an elongated handle or removable bag.

U.S. Pat. No. 5,718,469 (Ockerman) discloses a circular scoop with a securing ring attached to a handle for manual rotation of the securing ring with a support hoop. A waste bag is positioned upon the support hoop so that the waste bag remains open during use. The waste bag has a lower pouch portion and an upper neck portion.

U.S. Pat. No. 5,741,036 (Ring) discloses an animal waste scoop with a handle and shovel portion containing spaced fingers. The scoop is used with a disposable bag with spaced fingers which fit over the respective shovel fingers. The user pulls the bag over the shovel, grips the handle beneath the open end of the bag, and positions the shovel beneath the solid waste. The shovel is lifted so the waste remains on top of the fingers. The user then inverts the bag to remove it from the shovel and retain the waste within the bag.

U.S. Pat. No. 5,564,762 (Ring) discloses an animal waste assembly with an open ended container. A plastic bag with a closed end and an open end, and of a greater length than the container, inserts into the container as a liner. An integral exterior bag portion folds over the container exterior while it also covers the user's hand which holds the container. Waste is scooped into the bag over the open container end while the container and the person's hand are shielded by the bag. The bag's open end is then folded and inserted into the container.

U.S. Pat. No. 5,580,111 (Bohn) discloses a device which separates animal waste from unsoiled pet litter. The handle contains a grate and the grate has cross members with intervening spaces. The cross members retain animal waste while the intervening spaces allow unsoiled litter to pass between.

U.S. Pat. No. 5,536,055 (Kohn) also discloses a scoop for removing solid animal waste from granular material such as litter. It includes a receptacle with apertures so that solid animal waste cannot fall within, although granular particulars are sufficiently small to pass through.

U.S. Pat. No. 5,269,575 (Parvaresh) discloses a scoop with an elongated handle and a flat tray with a center slot at the lower end. There is also a disposable plastic bag with a closed end. The closed end is inserted into a center slot in the flat tray with the open end flattened, so that waste is deposited into the disposable plastic bag. The disposable plastic bag is then positioned under the dog. The dog deposits waste directly into the bag and the user pulls upon attached strings to seal the bag. There is also a rake tool to push the waste over the tray and into the plastic bag if the waste missed the bag.

U.S. Pat. No. 5,039,148 (Brauatovich) discloses a flat folded configuration which the user folds into a z-shape with a cardboard stiffener. The folded device opens to a scoop configuration and a separate cardboard segment becomes a paddle which pushes waste into the scoop. Side flaps move fold over the top panel to seal the enclosed waste, and a rubber band retains the closed position of the device after use.

U.S. Pat. No. 4,483,560 (Lordi) discloses a disposable waste scoop and scraper, but there is no removable attachable bag. U.S. Pat. No. 4,194,777 (Carns) discloses a device with an elongated handle and two pivoting scoop-shaped jaws which form a mouth. Each jaw has an adhesive pad for a cellophane sheet across the mouth and jaws, and which cellophane sheet holds animal waste. There is also a pull rod through the handle for spreading the jaws.

U.S. Pat. No. 4,146,260 (Carrington) discloses a leash holder scoop with a plastic disposable bag to position beneath a pet. The bag is reversibly secured to a bent tube attached to a handle with an attached pivoting leash latch. The bag holder is a narrow round sleeve with a flat segment which holds elastic fitting at the top of the bag and against the sleeve.

U.S. Pat. No. 4,017,015 (Jefferson) discloses two interfitting boxes made of biodegradable cardboard. The boxes are collapsible and can be carried in a pocket. Each box has an opening which is shaped as a scoop for the feces. The boxes then slide into each other to enclose the feces, and the device is then carried to a refuse container.

SUMMARY OF THE INVENTION

In the preferred embodiment of my invention, my portable animal waste remover comprises an elongated handle and a curved scoop which contacts the ground at the lower handle end. The lower handle end attaches at an angle to the scoop interior or exterior surface at the scoop posterior end, and approximately ⅙ of the handle length attaches to the scoop interior or exterior surface at the lower handle end. Preferably the lower handle end is enclosed within a hollow cylindrical indented portion of the scoop. The handle attaches to the interior scoop surface with a suitable chemical adhesive, screws, or a combination of both. Other mechanical fasteners and adhesives are satisfactory in other embodiments.

The curved scoop comprises a bottom floor which is flush with a level ground surface. The bottom floor tapers anterior where it converges with the first and second curved sides of the scoop. The posterior ends of each first and second curved side converge with the convex curved posterior wall of the scoop at angles. The scoop has an interior surface and an exterior surface, as well as a thickness.

The convex curved posterior wall has an upper edge which contains a slot. This slot is sufficiently deep to hold a bag handle, or bag uppermost edge, wherever a bag is placed over the scoop and held in place within the slot. To use the portable device, the scoop portion is held under the animal's hindquarters. The waste then falls into the bag which is attached to the interior surface by its insertion into the notch. When the waste process is complete, the user removes the bag edges from the slot, turns the bag over itself, and removes the enclosed waste from the scoop. The waste remains in the bag and is ready for disposal. Alternatively but less preferably the bag handles tie around the scoop handle.

Preferably the entire device is made of a lightweight material such as a cured rigid resin. In some embodiments the entire device is one integral device which is disposable, such as biodegradable cardboard. In other embodiments the elongated handle is extremely narrow and folds into segments, so the user can more easily carry the device in the same hand as the animal's leash. In still other embodiments, the handle comprises wheels at its lower end. With this wheel the user need not carry the device, but can pull or push it along the ground, much like a baby carriage or a child's wagon. In still other embodiments my portable animal waste removal device folds into a purse, pocket, or the user slings it over a shoulder or into a backpack.

With all embodiments of my portable animal waste remover, there is no need to bend toward the ground. This feature is a special benefit for persons with arthritis or excessive weight. Similarly, there is no need to manually remove waste with a bag, and my device is effective even if the animal has diarrhea. There is no requirement to clean the device after each use, and the anterior end of the curved scoop tapers to provide sufficient clearance for small animals.

The front portion also tapers on each side laterally for clearance between an animal's rear legs. There can be a removable shoulder strap and an adjustable handle length. My device is essential for indoor public environments such as pet shows, veterinarian facilities and pet stores. The elongated handle places the waste device properly on the ground and under the animal.

Accordingly, one goal of my invention is to provide a more convenient method of collecting animal waste.

Another goal of my invention is to eliminate bending of the consumer to manually scoop waste.

Another goal of my invention is to simplify the isolation of the waste with a disposable bag without touching the waste.

Another goal of my invention is to free at least one hand of the user and eliminate the burden of carrying the device.

These and other features of my portable animal waste removal device are illustrated and explained by the drawings and DETAILED DESCRIPTION OF THE INVENTION, infra.

BRIEF DESCRIPTION OF THE DRAWINGS

FIG. 12 D illustrates a cross-sectional lateral view of the collapsed portable animal waste remover with a spring biased wire and button.

DETAILED DESCRIPTION OF THE INVENTION

Figure 1:
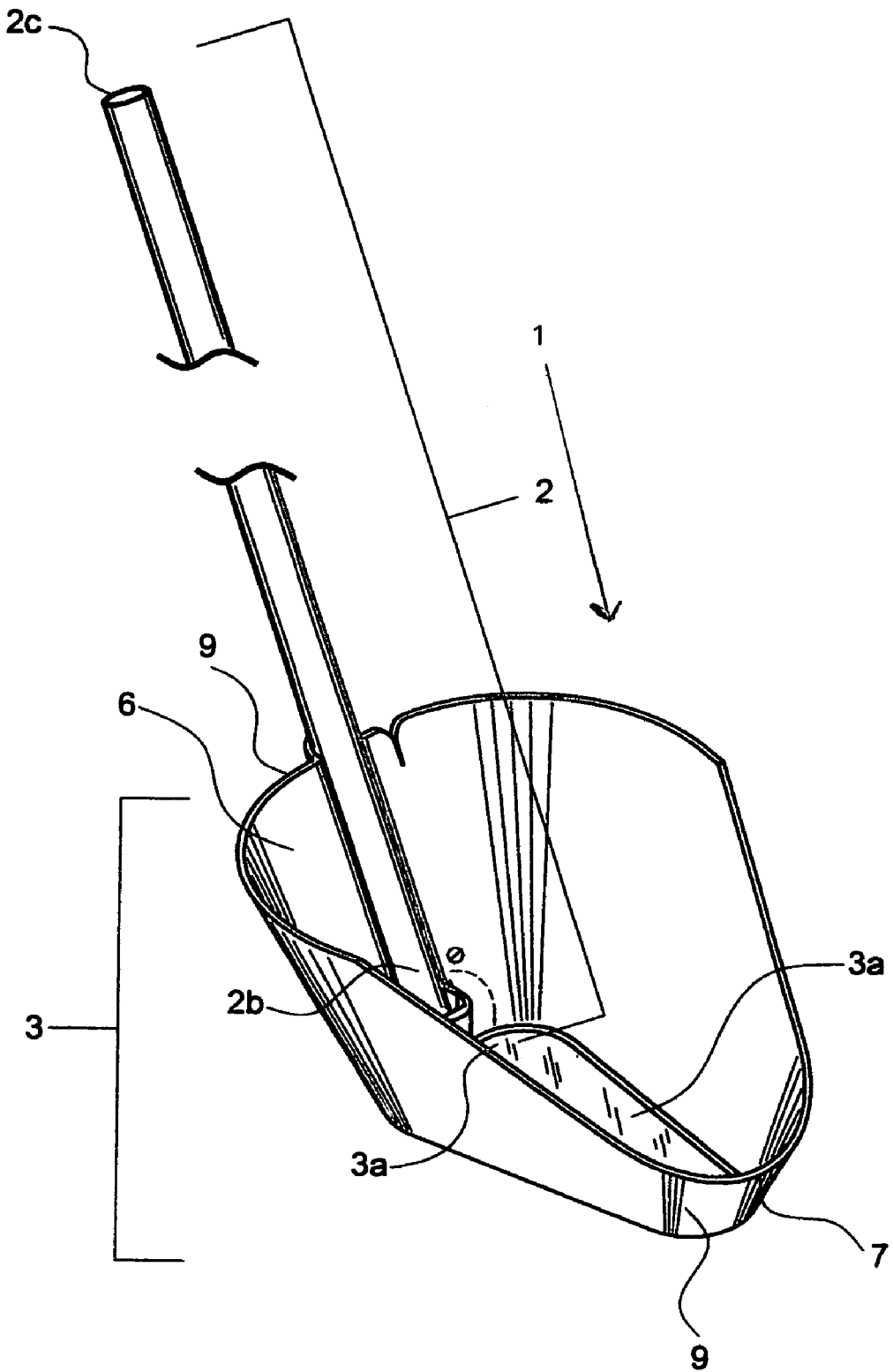
FIG. 1 illustrates an anterior perspective view of the preferred embodiment portable animal waste remover.

Referring initially to FIG. 1, my portable animal waste remover 1 comprises an elongated component handle 2 and a scoop 3 in the preferred embodiment. Elongated handle 2 has an upper handle end 2c and a lower handle end 2b. Lower handle end 2b attaches to scoop 3 at an angle theta of approximately 65 degrees from the horizontal. Elongated handle 2 is approximately 37 and ½ inches in length and approximately ¾ inch in diameter for the preferred cylindrical handle shape. However, other cross-sectional shapes and lengths of elongated handle 2 are also within the scope of my invention.

Elongated handle 2 is preferably made of wood. Other satisfactory materials include fiberglass cloth, reinforced epoxy resin, and extruded or injection molded resin. Additional recommended materials include tough lightweight plastics such as polyvinyl chloride, or a lightweight metal such as aluminum or stainless steel. Materials such as carbon fiber, fiberglass and heat-cured and/or molded resins are also within the scope of my invention.

The most preferred resin for mold production of the scoop 3 is DuPont Crastin® LW 9020 BK580 which is a black polybutylene terephthalate alloy containing 20% fiberglass. Please see FIG. 6. This specific resin exhibits the following physical properties (among others not listed herein) at 23° C. unless otherwise stated:

| (50) | (a) | Density | 1.35 grams per cubic centimeter |
|---|---|---|---|
| | (b) | Tensile Modulus | 1015 kpsi |
| | (c) | Stress at Break | 15.5 kpsi |
| | (d) | Strain at Break | 2.5% |
| | (e) | Notched charpy impact strength | 7 kJ/m² |
| | (f) | Unnotched charpy impact strength | 50 kJ/m² |
| | (g) | Melting Point: | 225° C. |
| | (h) | Deflection temperature at 1.8 MPa (264 psi) | 150° C. |
| | (i) | Melting temperature at 10° C. per minute | 225° C. |
| | (j) | Mold temperature range | 30-130° C. |

Other embodiments of one-piece integral portable animal waste removers are made of stamped stainless steel, aluminum, painted cold rolled steel or other lightweight metals. Die cast aluminum, die cast zinc or die cast magnesium are also satisfactory, as is cardboard which is detachable and disposable.

Figure 1A:
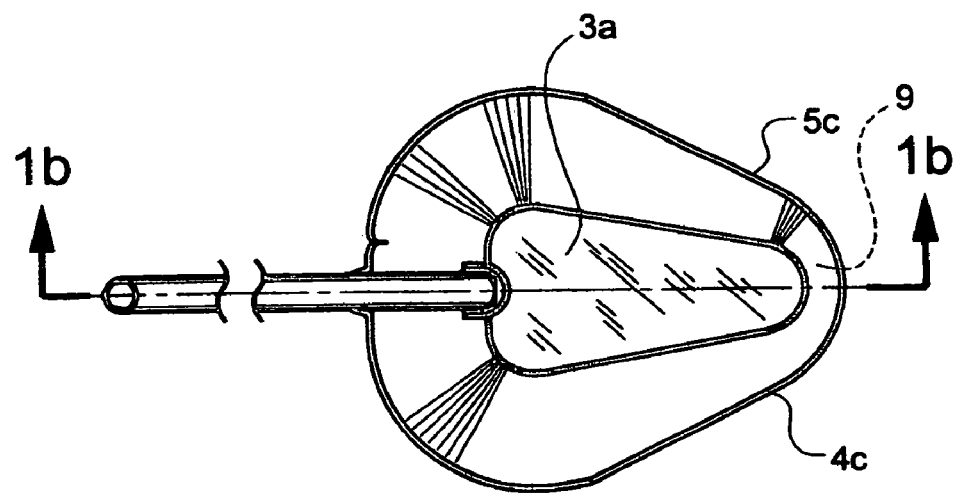
FIG. 1A illustrates a top plan view of the portable animal waste remover with a hollow elongated handle.
Figure 2:
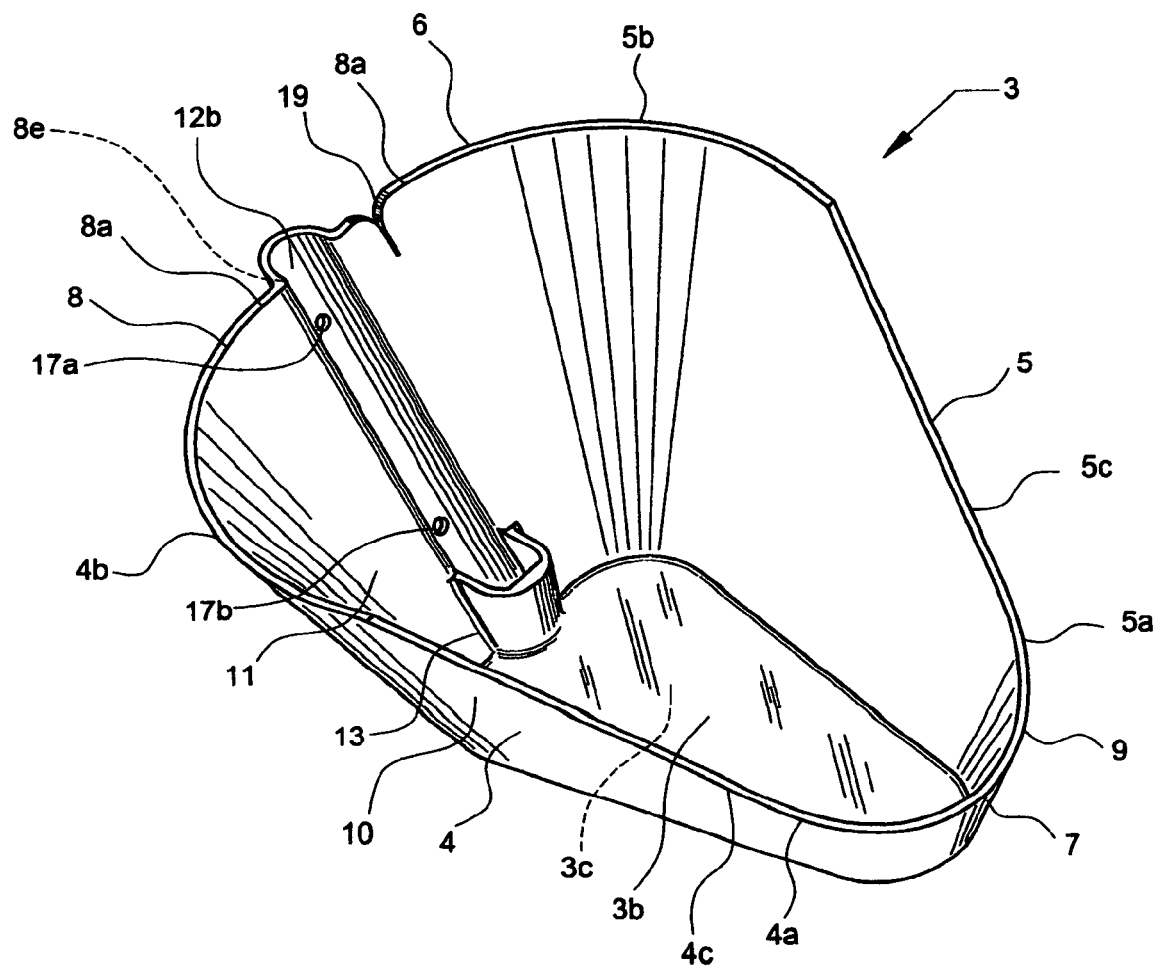
FIG. 2 illustrates a close up isolated view of the scoop of the portable animal waste remover of FIG. 1.

Referring now to FIG. 2, scoop 3 has a first lateral scoop side 4, a second lateral scoop side 5, wide posterior scoop end 6 and narrow anterior scoop end 7. As seen in FIG. 1A scoop 3 has a lowermost scoop floor 3a which is roughly triangular in two-dimensional shape and tapers toward narrow anterior scoop end 7. Lowermost scoop floor 3a has a flat upper surface 3b and flat lower surface 3c. At narrow anterior scoop end 7, lowermost floor 3a converges with first lateral scoop side 4 and second lateral scoop side 5.

Still referring to FIG. 2, each first and second lateral scoop side 4,5 respectively has a first and second anterior side end 4a, 5a respectively and a first and second posterior side end 4b, 5b respectively. Each first and second lateral scoop side 4, 5 also has a first and second sloping upper side edge 4c, 5c respectively. Each first and second sloping upper side edge 4c, 5c respectively slopes upwardly towards posterior scoop end 6 where each lateral scoop side 4,5 becomes posterior convex curved scoop side 8.

Figure 3:
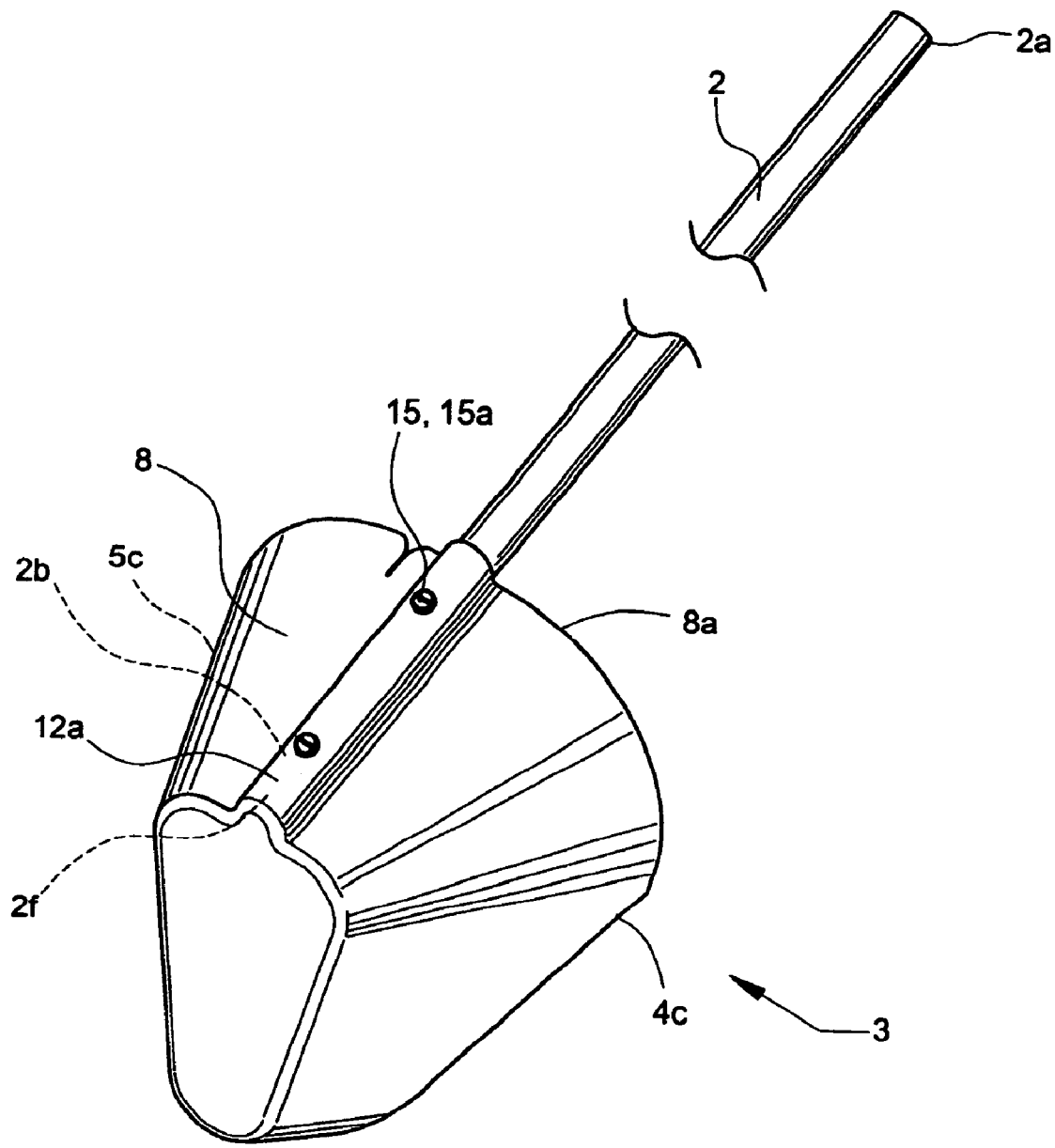
FIG. 3 illustrates a posterior view of the portable animal waste remover of FIG. 1.

Referring to FIG. 3, each first and second sloping upper side edge 4c, 5c preferably converges with upper posterior convex curved scoop side edge 8a at an arc of approximately 35 degrees. When viewed posteriorly, scoop 3 comprises a semi-cylindrical outwardly protruding structure 12a, which corresponds to scoop cylindrical indentation 12b within scoop interior surface 11. Please see FIGS. 2 and 3.

Still referring to FIG. 2, each first and second anterior side end 4a, 5a respectively also converges with anterior scoop side 9, thereby forming a round tapered v-shape in upper plan view. Please see FIG. 1A. Anterior scoop side 9 is shorter in length and height than posterior convex curved scoop side 8. Each first and second anterior side end 4a, 5a respectively is incrementally shorter in height than first and second posterior side ends 4b, 5b respectively, but are continuous and integral to ends 4b, 5b. Preferably scoop 3 is one integral piece, but it consists of separate components in other embodiments, infra. In some embodiments scoop 3 also comprises an exterior layer of acrylic paint.

Figure 1B:
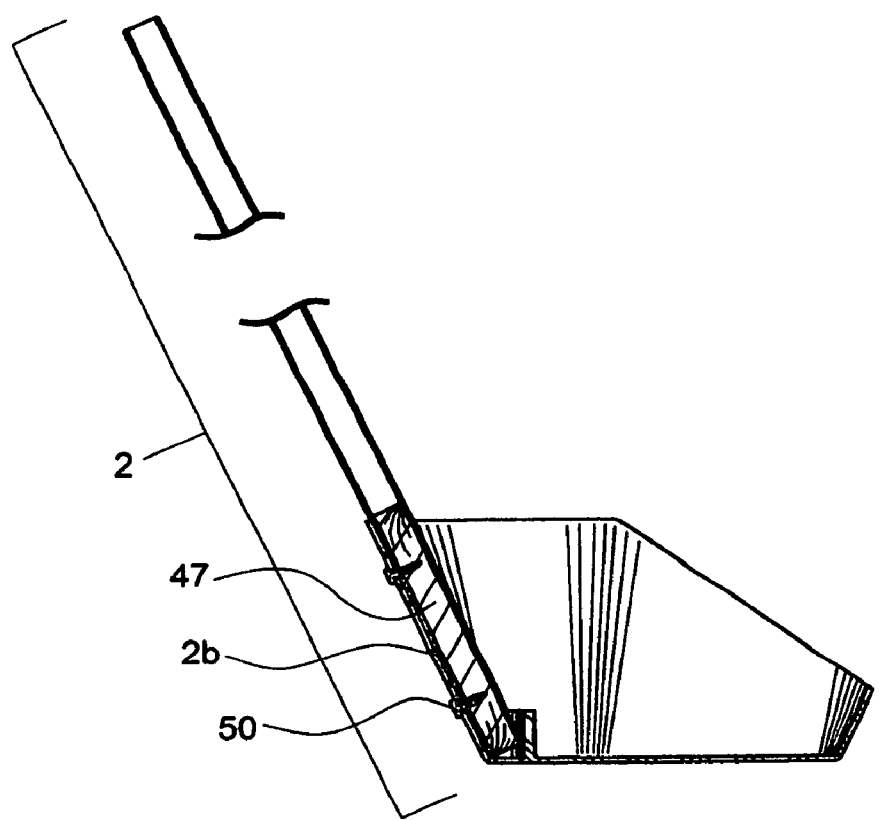
FIG. 1B illustrates the portable animal waster remover of FIG. 1A through view line 1b/1b of FIG. 1A.
Figure 1C:
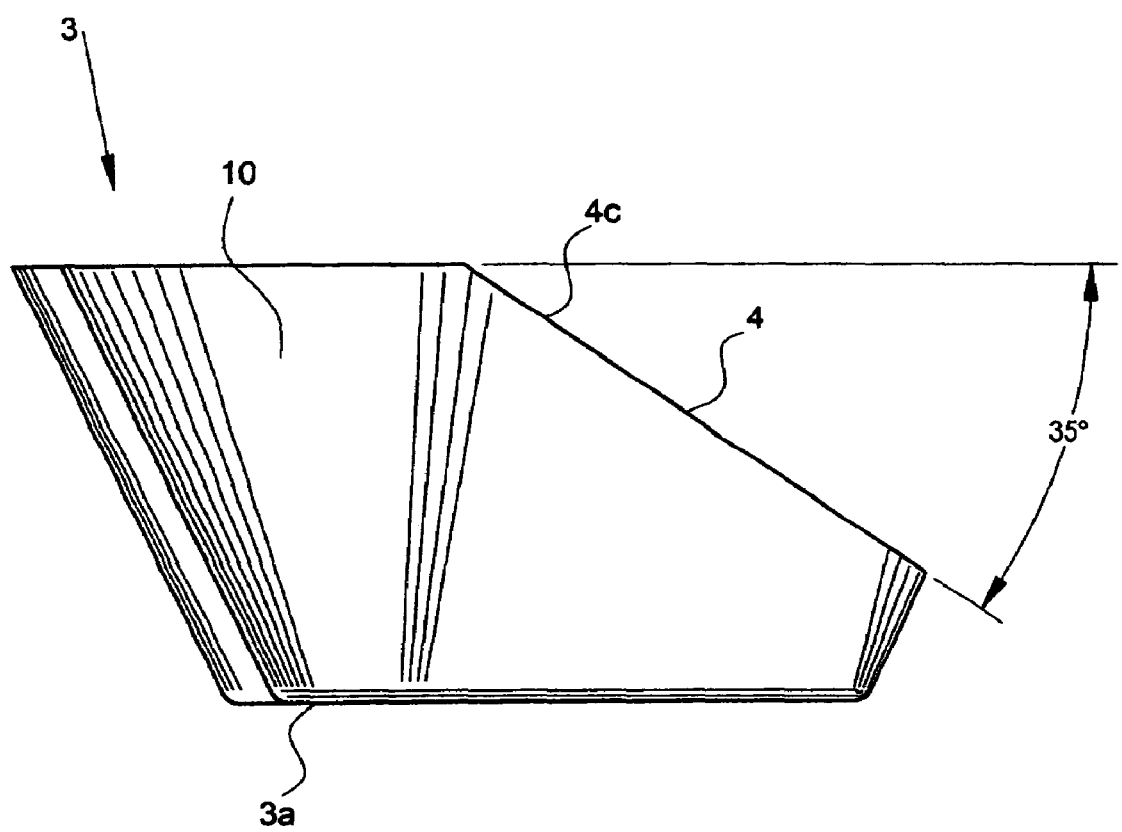
FIG. 1C illustrates an isolated lateral view of the scoop of the portable animal waste remover of FIG. 1.

Referring to FIGS. 1C and 2, scoop 3 has a curved exterior surface 10 and a curved interior surface 11. Interior surface 11 is preferably smooth and may be lined with a material such as fiberglass which is easily cleaned. Scoop 3 has a thickness which is preferably approximately 3/32 inch. Preferably scoop 3 is approximately ten inches in length, approximately nine and one-quarter inches in width at its widest posterior width, and two and one-quarter inches at its narrowest anterior width. Scoop 3 preferably has a maximum depth of approximately five inches at posterior convex curved scoop side 8. Scoop 3 has a maximum depth of approximately one and one-half inches at anterior scoop side 9 in the preferred embodiment.

Referring to FIGS. 2 and 3, handle lower end 2b preferably attaches to curved scoop posterior side 8 at approximate center 8e of upper posterior side edge 8a along scoop interior surface 11. Preferably approximately seven inches of lower elongated handle end 2b inserts within semi-cylindrical indentation 12b of interior surface 11. Lowest elongated handle point 2f inserts within circular female part 13. Circular female part 13 integrally attaches to (1) upper interior floor surface 3b, and (2) lowermost semi-cylindrical indentation 12b. In other embodiments, elongated handle end 2b attaches to semi-cylindrical indentation 12b (not seen in these views).

Still referring to FIGS. 2 and 3, preferably elongated handle 2 adheres within semi-cylindrical indentation 12b and attaches with assembly screws 15 or rivets 15a to scoop curved posterior side 8. Assembly screws 15 or rivets 15a insert through semi-cylindrical indentation 12b and into upper and lower screw threaded apertures 17a, 17b respectively within elongated handle 2. In the preferred embodiment elongated handle 2 has a cylindrical shape, but other shapes are also within the scope of the invention 1. Preferably there are two assembly screws or rivets 15, 15a respectively, but other numbers of screws or rivets 15, 15a are also within the scope of the invention 1.

In embodiments in which scoop 3 and elongated handle 2 are produced separately, scoop 3 preferably attaches to elongated handle 2 with preferred chemical structural adhesive 3M® Scotch-Grip™ Plastic Adhesives. These adhesives are preferred in combination with assembly screws 15 or rivets 15a, whenever scoop 3 and handle lower end 2b are made of wood, plastic or steel. These adhesives exhibit the following physical properties:

(i) heat curable
(ii) light-tan color
(iii) maximum bonding range—40 minutes
(iv) overlap shear (psi)—388
(v) heat resistance
approximately 121° C. (cured)
approximately 71° C. (uncured)

In other embodiments there are additional diverse mechanical fasteners. In additional embodiments there is (1) adhesive with no mechanical fasteners, or (2) mechanical fasteners without adhesive. In still other embodiments there is no semi-cylindrical indentation 12b or circular female part 13. Instead, elongated handle 2 attaches directly to exterior or interior scoop surfaces 10, 11 respectively.

Figure 7A:
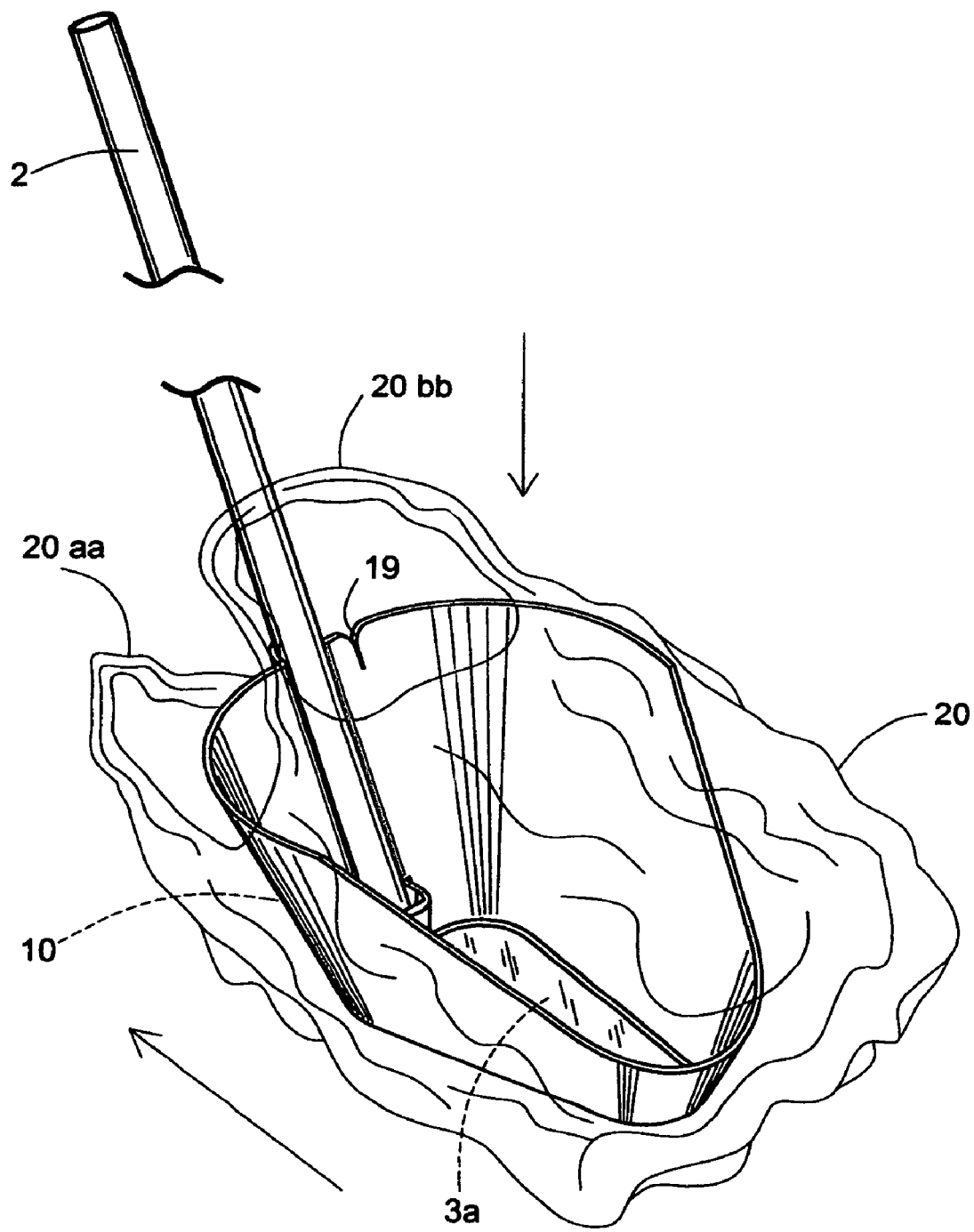
FIG. 7A illustrates a partial anterior view of the portable animal waste remover of FIG. 1 within an open bag.
Figure 7B:
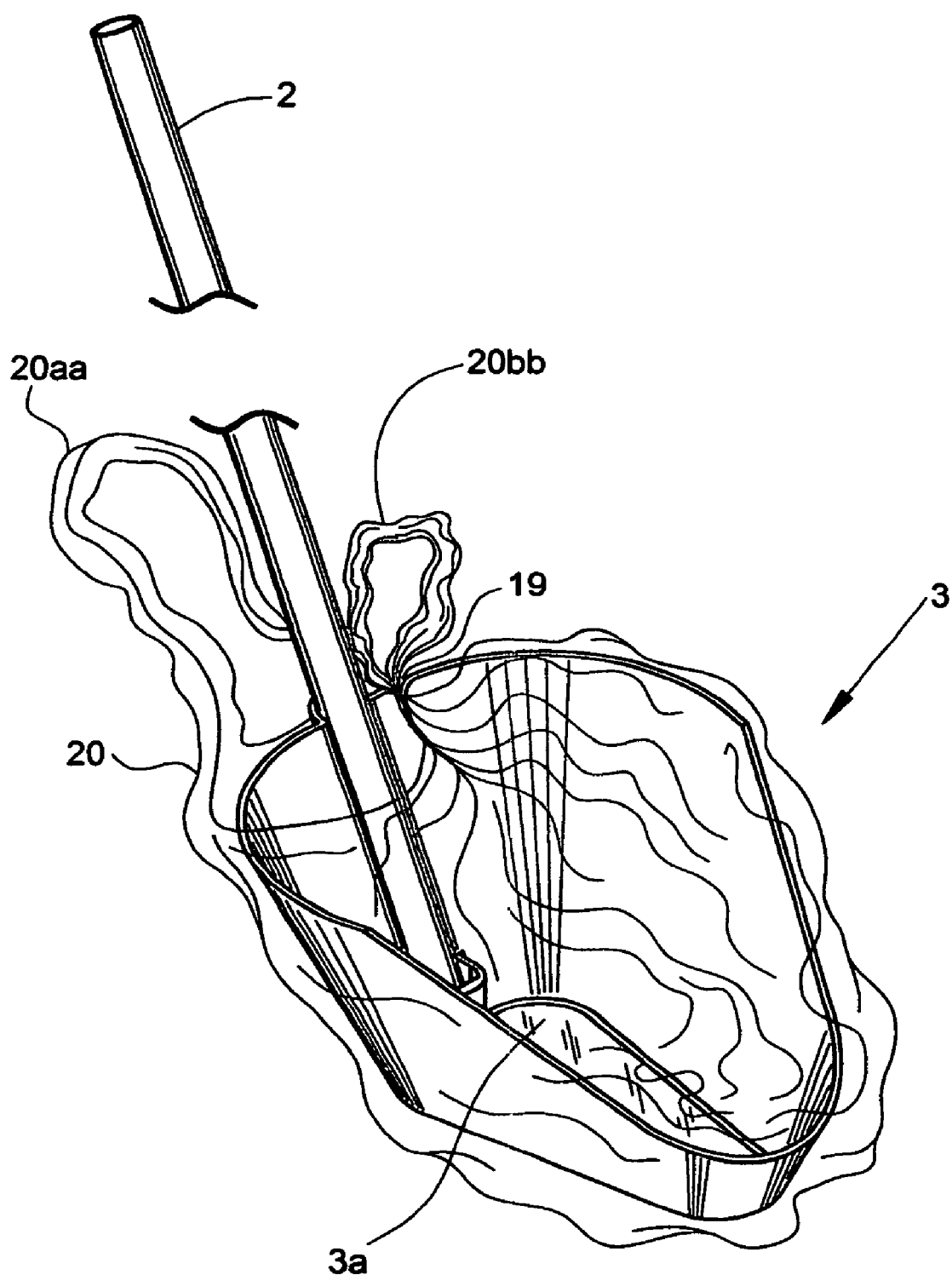
FIG. 7B is a partial anterior view of the portable animal waste remover of FIG. 1 with one bag handle inserted within a slot.
Figure 7C:
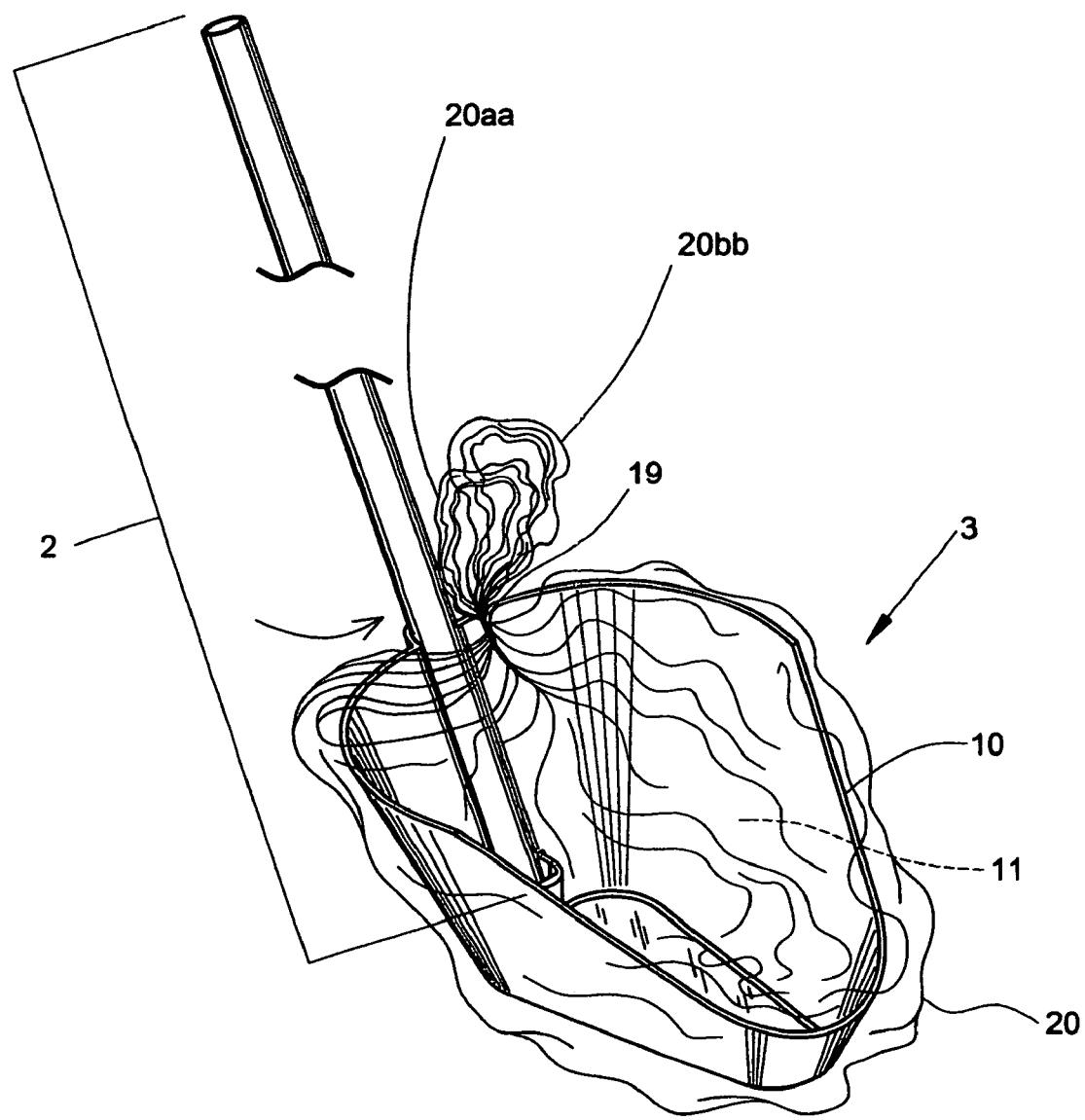
FIG. 7C is a partial anterior view of the scoop of FIG. 1 with both bag handles inserted within the slot.

Referring to FIGS. 2 and 7A, preferably uppermost posterior side edge 8a comprises notch 19. However, in other embodiments notch 19 is located at other points along scoop 3. Notch 19 is preferably approximately ¾ inches in depth and located approximately one inch from scoop posterior side center 8e. As seen in FIGS. 7A and 7B, disposable bag 20 covers scoop exterior surface 10, scoop interior surface 11 and scoop floor 3a. As seen in FIG. 7C, disposable bag first and second upper edges or handles 20aa, 20bb respectively wrap elongated handle 2 at scoop center 8e and insert within notch 19.

OTHER EMBODIMENTS

Portable Animal Waste Remover 1 with Dowel 47

As illustrated in FIGS. 1A and 1B, in other embodiments elongated handle 2 is hollow and made of materials such as plastic, polyvinyl chloride piping or metal tubing. Short wooden dowel 47 snugly inserts within lower handle end 2b. Wooden dowel 47 attaches lower handle end 2b to a plastic, metal or carbon fiber scoop 3 with wood screws 50. Screws 15 thereby insert into posterior scoop side 8, and through handle wall 3t and into dowel 47 to attach elongated handle 2 to scoop 3.

In other embodiments, a hand or shoulder strap is threaded through elongated handle 2. A sufficiently small model can fit within a backpack or pocket, and in other embodiments scoop 3 is removable and disposable.

Portable Animal Waste Remover 1 with Spring Loaded Button 30

Figures 8A, 8B:
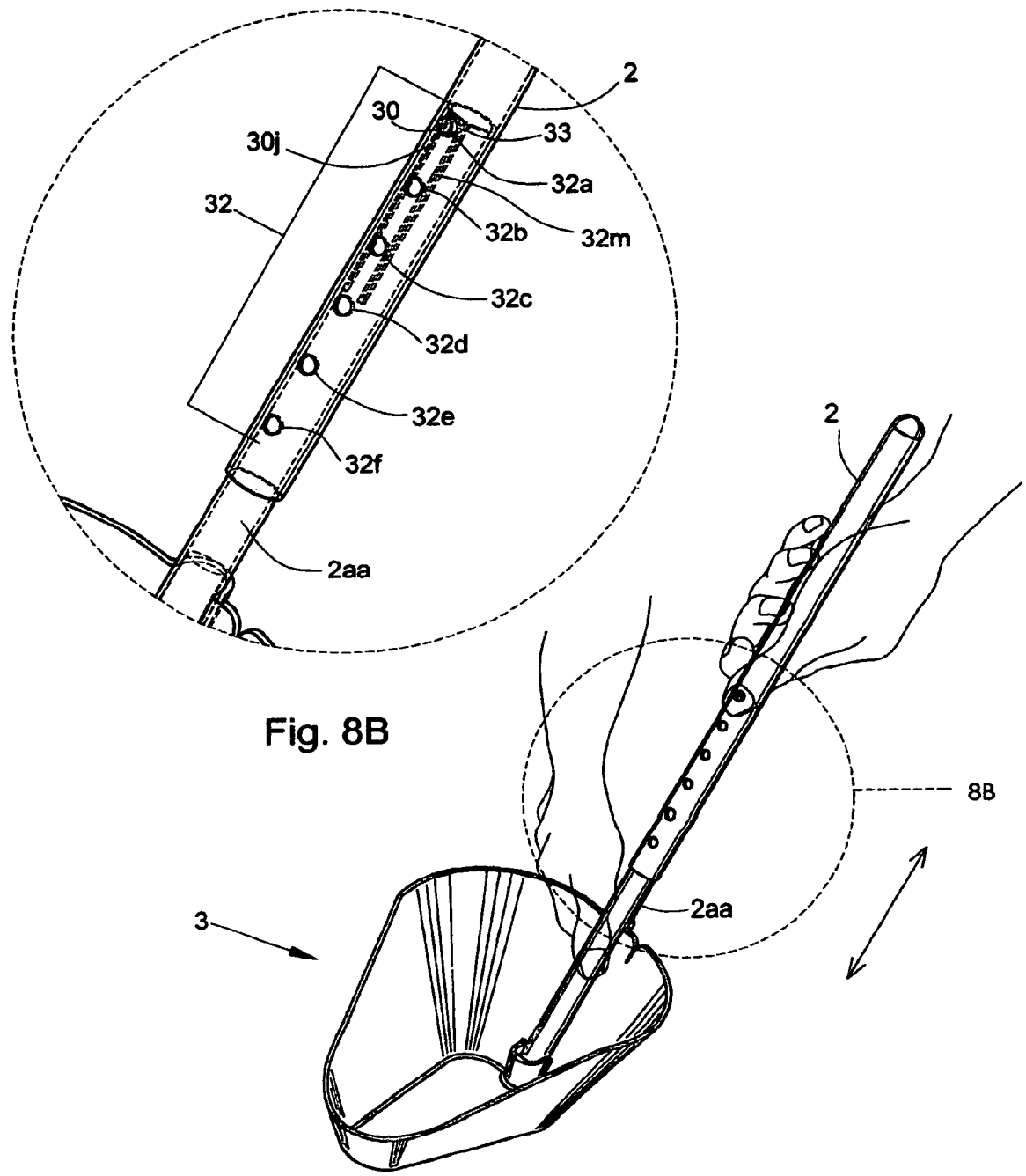
FIG. 8A illustrates a partial anterior view of a portable animal waste remover with a spring biased adjustable two component handle.
FIG. 8B illustrates an isolated view of the spring button feature of the embodiment with an integral adjustable button of the hollow handle extension.
Figure 8C:
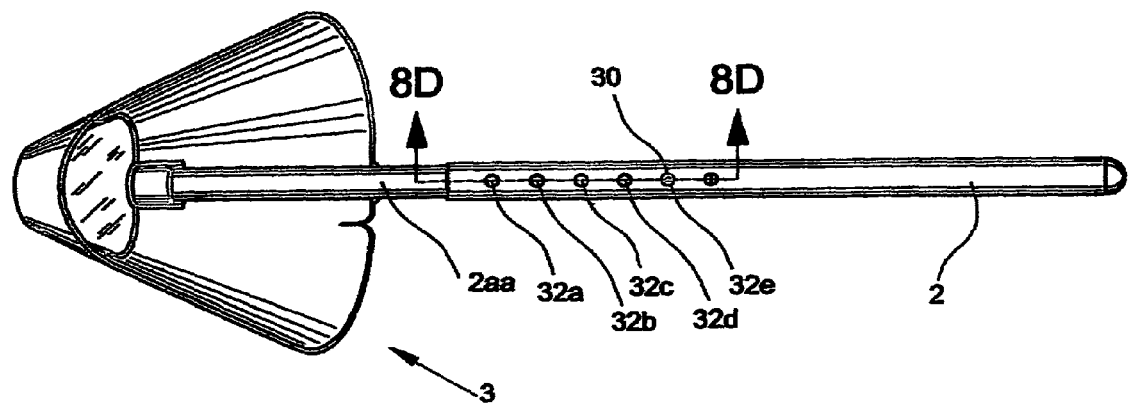
FIG. 8C illustrates a lateral view of the spring button feature of the FIG. 8A embodiment.

Referring to the embodiment of FIG. 8A, hollow elongated handle 2 is preferably made of extruded aluminum tubing. This aluminum tubing is preferably approximately three-quarters of an inch in cross-sectional diameter and approximately twenty inches in length. Handle length extension 2aa inserts within hollow elongated handle 2 and is preferably made of plastic, fiberglass, carbon fiber or metal.

As seen in FIG. 8B, handle length extension 2aa is also hollow and preferably cylindrical. Handle length extension 2aa is of sufficiently small diameter to snugly insert and move vertically from lower elongated handle opening 2d. Spring loaded button 30 fits within one of a linearly and axially aligned series of button adjustment apertures 32a, 32b, 32c, etc. (generically button adjustment apertures 32) within hollow elongated handle 2.

Figure 8D:
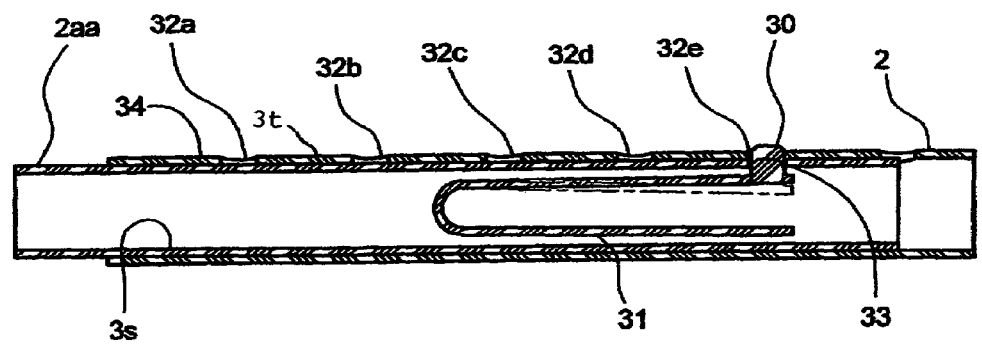
FIG. 8D illustrates a closeup isolated view of a spring-biased wire embodiment through view line 8D/8D of FIG. 8C.

Referring to FIGS. 8B and 8D, inner spring aperture 33 within handle length extension wall 2aa congruently aligns with an adjustment aperture 32 whenever handle length extension 2aa slides within elongated handle 2. As seen in FIG. 8D, spring tempered wire 31 is soldered or staked to button 30. Spring tempered wire 31 also lies within hollow handle length extension 2aa and presses against hollow handle extension inner wall 2s. To change the protruding length of hollow handle length extension 2aa, the user initially presses upon button 30. Hollow handle length extension 2aa slides linearly upwardly or downwardly within hollow elongated handle 2, while wire 31 remains compressed within hollow handle length extension.

Still referring to FIGS. 8B and 8D, inner spring aperture 33 congruently aligns with an adjustment aperture 32. When the user's manual pressure is released, then button 30 protrudes from handle length extension 2aa and hollow elongated handle 2 through apertures 32, 33. Button 30 thereby retains handle extension 2aa at a predetermined length which protrudes from elongated handle opening 2d. Spring wire 31 is preferably made of metal wire or flexible plastic.

Referring to FIG. 8D, when the user applies manual pressure to button 30, spring tempered wire 31 tenses and button 30 moves below handle extension surface 2s and elongated handle wall 3t. Handle extension 2aa then slides linearly upward or downward within elongated handle extension 2 until button 30 congruently aligns with another pre-selected adjustment aperture 32.

Figure 8E:
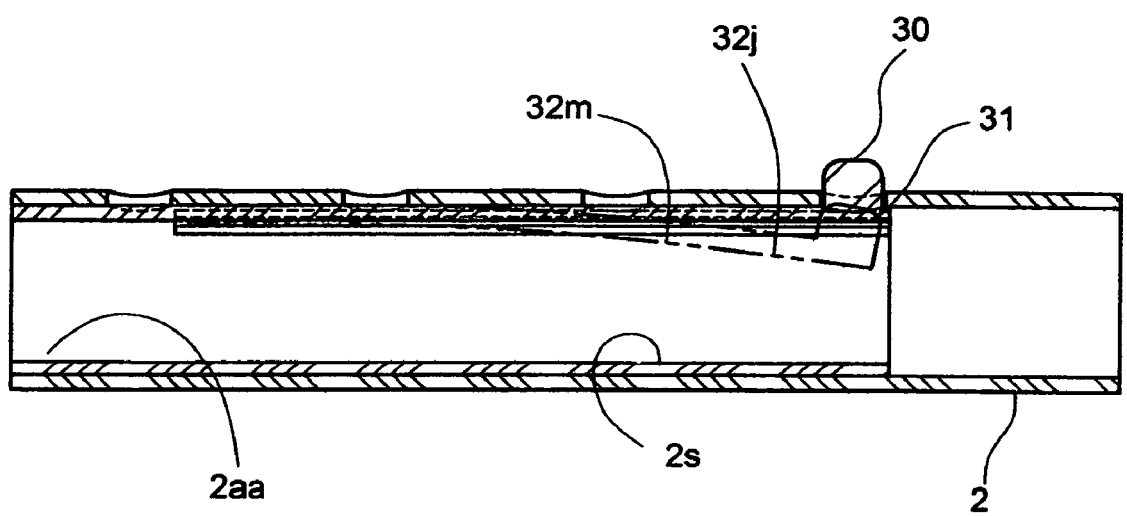
FIG. 8E illustrates a closeup transverse sectional view of the FIG. 8B embodiment and designating directional movement in phantom.

Referring to FIGS. 8B and 8E, in another embodiment button 30 attaches to uppermost prong end 32j of flexible prong 32m. In this embodiment, flexible prong 32m is an integral component of upper handle length extension wall 2s of handle length extension 2aa. Please see FIG. 8E. In the FIGS. 8B/8E embodiment the preferred plastic polymer for elongated handle 2 is DELRIN® (acetal-homopolymer POMH) which exhibits the following physical properties (among others):

| | |
|---|---|
| (71) Dielectric constant @ 1 MHZ | 3.7 |
| Dielectric strength (kVmm-1) | 20 |
| Coefficient of friction | 0.2-0.35 |
| Tensile strength (MPa) | 70 |
| Density (g cm-3) | 1.42 |
| Limiting oxygen index (%) | 15.0 |
| Coefficient of thermal expansion ($\times 10^{-6} K^{-1}$) | 122 |
| Specific heat ($JK^{-1}kg^{-1}$) | 1500 |

In smaller versions of this embodiment, elongated handle 2 and handle extension length 2a reversibly collapse to fit within a shoulder bag or large pocket.

Portable Animal Waste Remover with Collet Connector 34

Figure 9A:
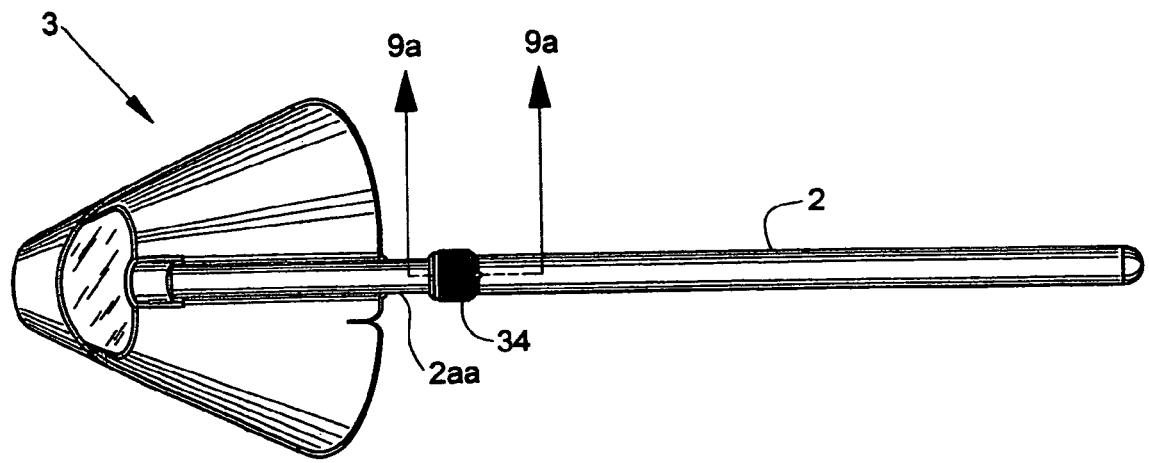
FIG. 9A illustrates a lateral view of the assembled collect connector embodiment of the portable animal waste remover.

Referring now to FIG. 9A, hollow elongated handle 2 contains handle length extension 2aa, and both extension 2aa and elongated handle 2 are enclosed by collect connector 34. Collet connector 34 is a cylindrical metal or plastic segment which reversibly encloses handle extension 2aa and overlapping threaded opening 2d of lower elongated handle 2. As seen in FIGS. 9C and 9D, collect connector 34 comprises interior collet threads 35 and exterior knurl 35b. Exterior knurl 35b (upon exterior collet surface 34a) contains knurl facets 35c. Interior collet threads 35 lie perpendicular to knurl facets 35c, and interior collet threads 35 encircle interior collet surface 34c.

Referring now to FIGS. 9C and 9D, lower elongated handle opening 2d comprises adjacent discontinuous threads 35e, and threads 35e form discontinuous arc segments 36. Interior collet threads 35 tightly interlock corresponding discontinuous threads 35e whenever collet connector 34 engages elongated handle end 2d. Adjacent discontinuous threads 35e, with perpendicular elongated spaces 38 between discontinuous arc segments 36, allow collet connector 34 to slightly compress lower handle extension end 2d.

To change the protruding length of handle length extension 2aa, the user loosens collet connector 34 which encloses and immobilizes elongated handle end 2b and handle length extension 2aa. He or she then pushes handle length extension 2aa into, or from, hollow elongated handle end 2b until the predetermined handle length extension dimension protrudes from elongated handle end 2d.

Figure 9B:
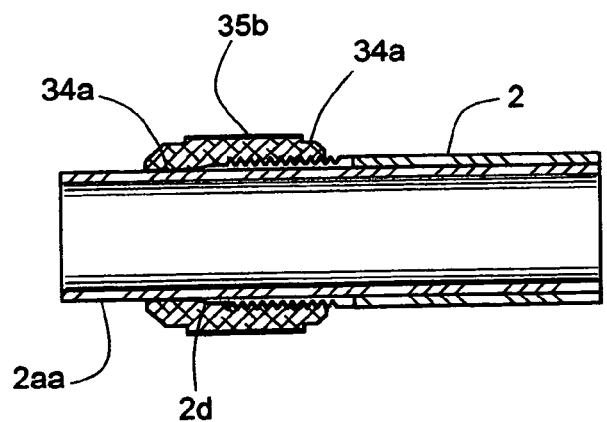
FIG. 9B illustrates the FIG. 9A embodiment through view line 9a/9a of a collet connector.
Figure 9C:
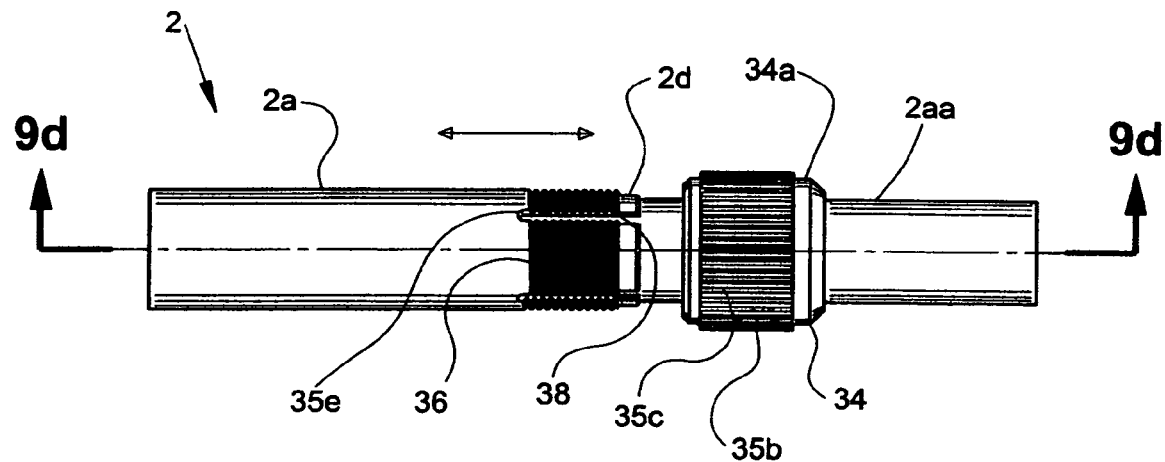
FIG. 9C is an isolated closeup view of the collet connector and elongated handle end of the FIG. 9A embodiment.
Figure 9D:
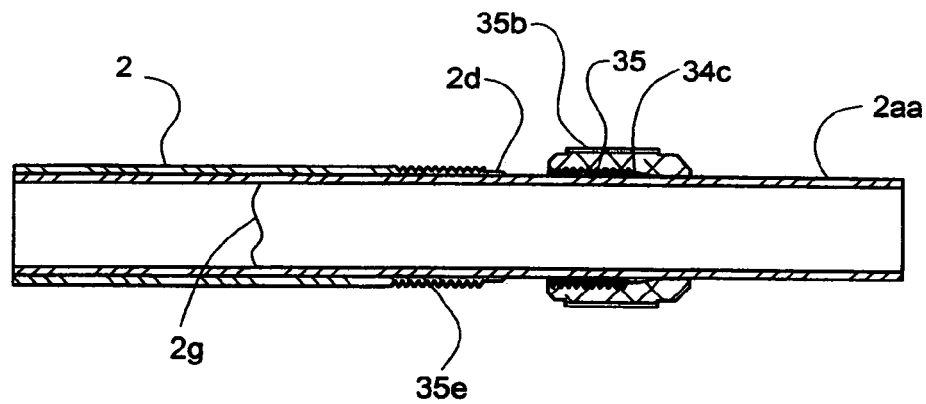
FIG. 9D illustrates the FIG. 9A embodiment through view line 9d/9d of FIG. 9C.

As best-illustrated in FIGS. 9A and 9B, the user now rotates and tightens collet connector 34 to interlock interior collect threads 35 with discontinuous adjacent threads 35e. Once tightened, collet connector 34 maintains hollow elongated handle 2 and handle length extension 2*aa* in this predetermined position. In smaller versions of this embodiment, elongated handle 2 and handle extension length 2*a* reversibly collapse to fit within a shoulder bag or pocket.

Portable Animal Waste Removal Device 1 with Woven and Mesh Scoops 3

Figure 10:
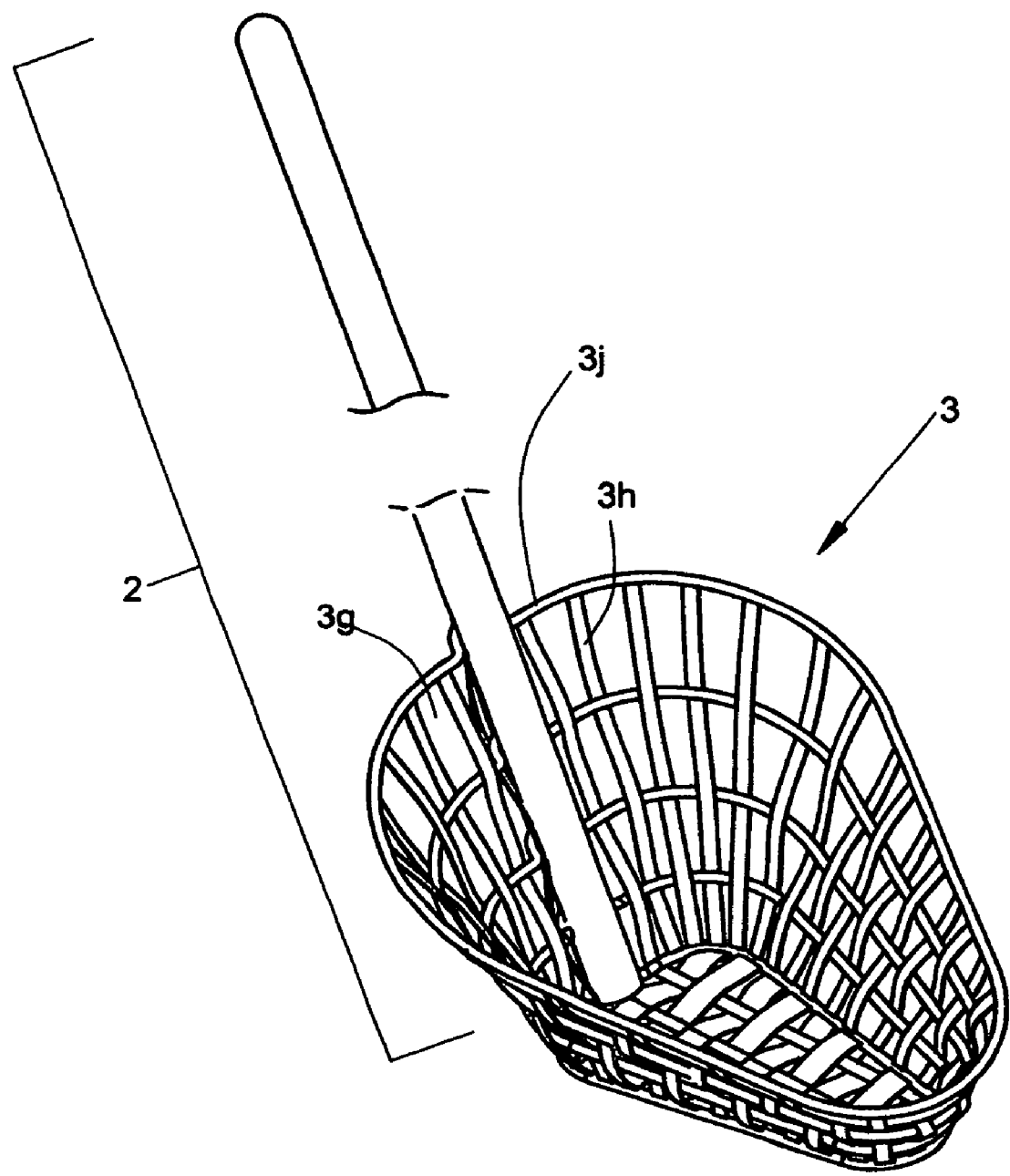
FIG. 10 illustrates a portable animal waste remover with a woven scoop.
Figures 11A, 11B:
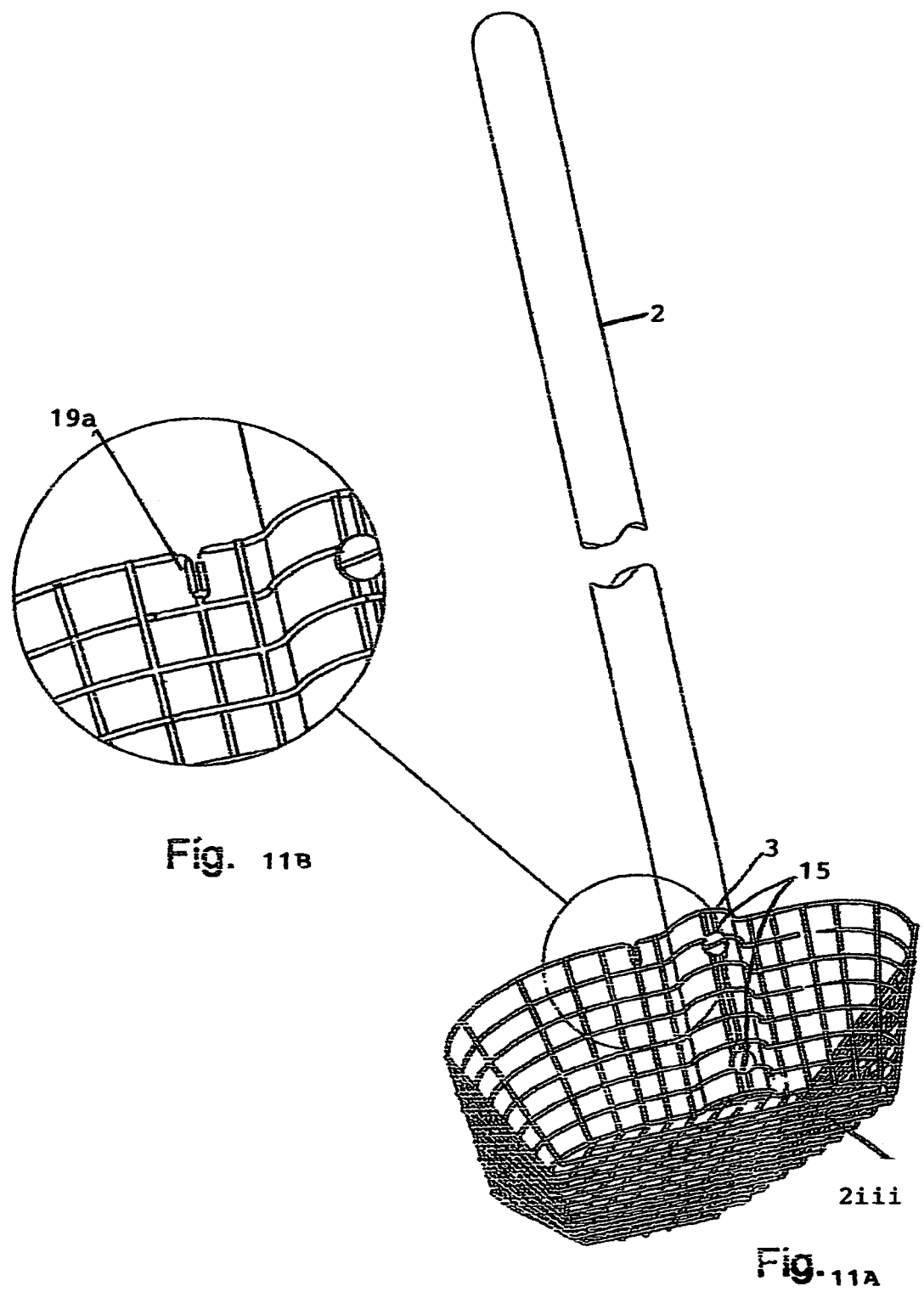
FIG. 11A illustrates a posterior partial prospective view of a wire mesh scoop with a wire notch.
FIG. 11B illustrates a closeup view of the wire notch of FIG. 11A.
Figure 12A:
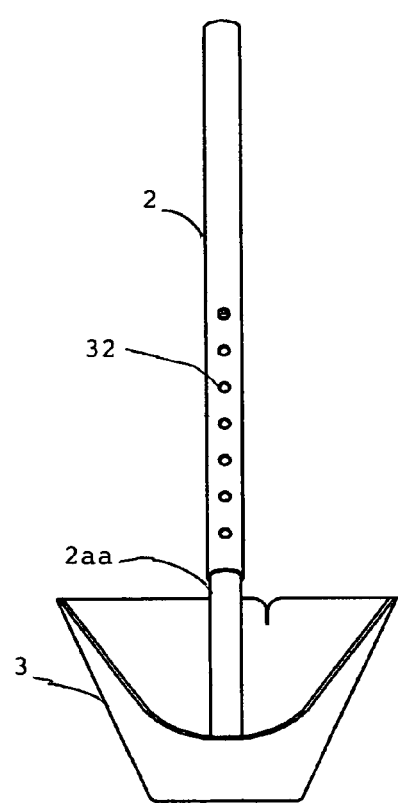
FIG. 12A illustrates a top plan anterior view of a collapsed portable animal waste remover with an integral prong and button.
Figure 12B:
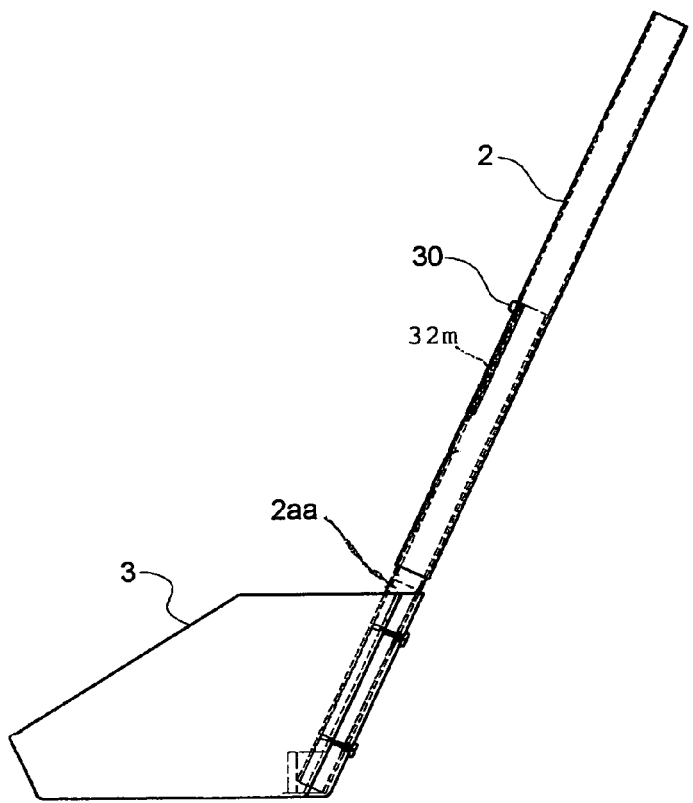
FIG. 12B illustrates a lateral sectional view of a collapsed portable animal waste remover with an integral prong and button.
Figures 12C, 12D:
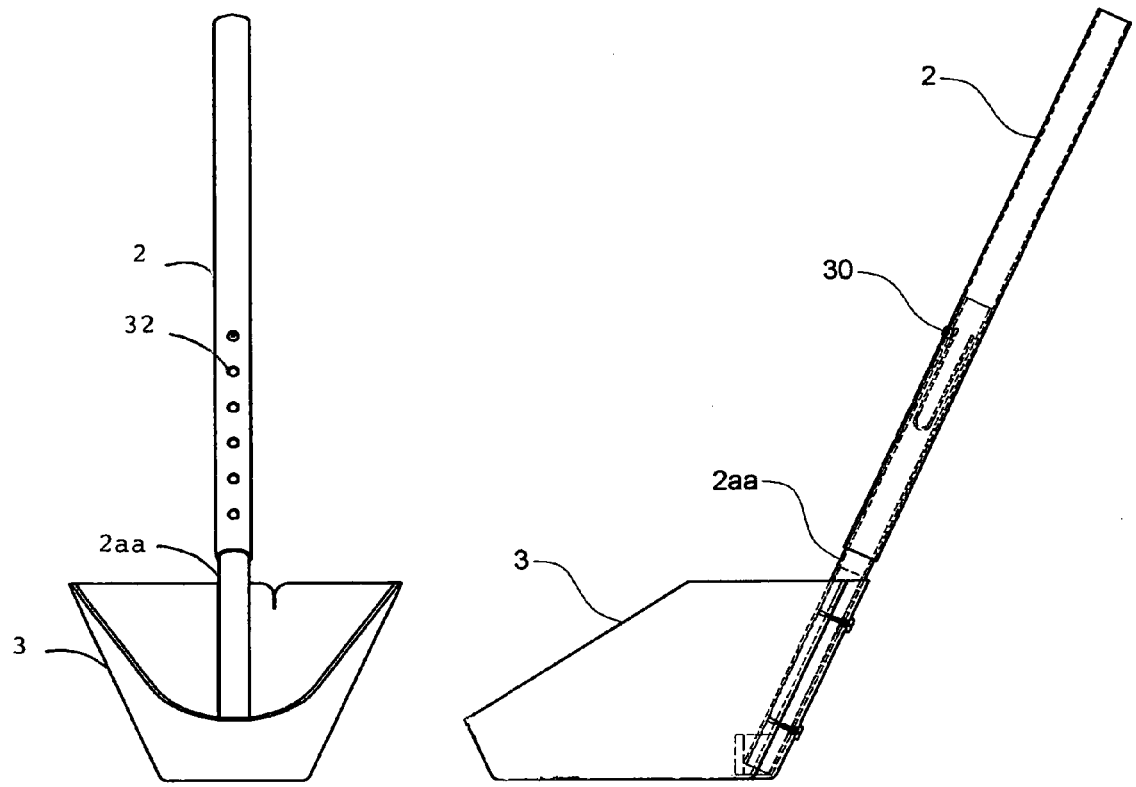
FIG. 12C illustrates a top plan anterior view of a collapsed portable animal waste remover with a spring biased wire and button.
Figure 12E:
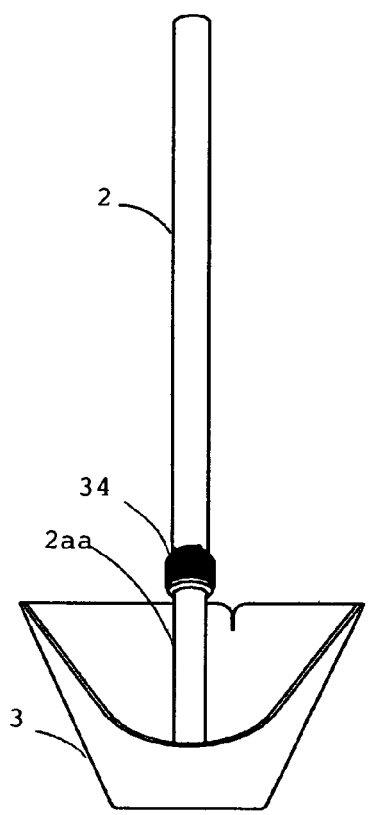
FIG. 12E illustrates a top plan anterior view of the collapsed portable animal waste remover with a collet connector.
Figure 12F:
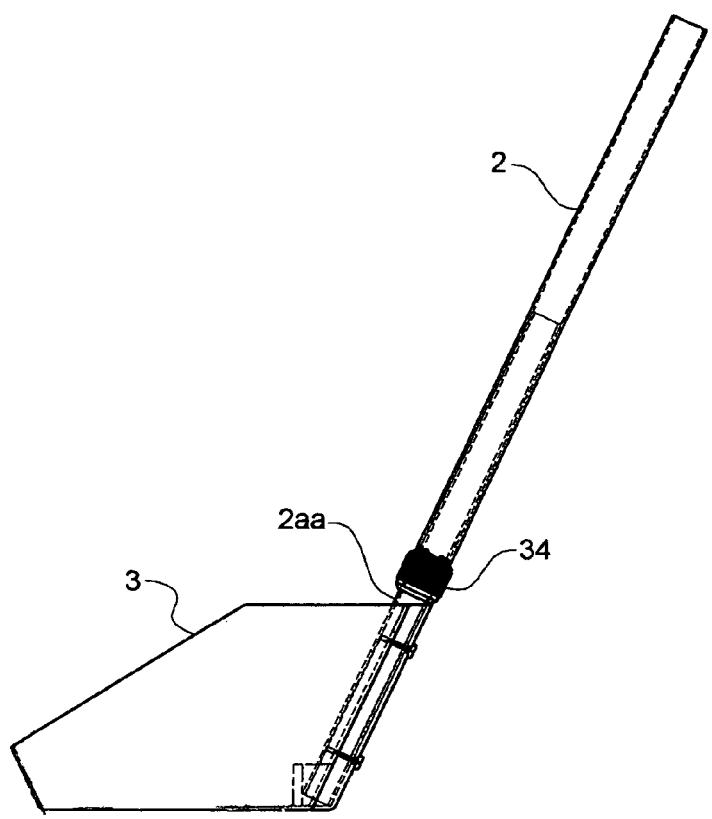
FIG. 12F illustrates a cross-sectional lateral view of the collapsed portable animal waster remover with a collet connector.

Referring now to FIG. 10, basket weave scoop 3 is compatible with an elongated handle 2 made of materials such as fiberglass, cured resin, or hollow metal or plastic tubing. In other embodiments, handle length extension 2*a* attaches to basket scoop 3 with a wood dowel and wood screws at lower elongated handle end 2*iii*. Notch 19 is not necessary in this embodiment, because bag handles 20*aa*, 20*bb* loop through spaces 3*g* between woven scoop ribs 3*h* and posterior basket rim 3*j*.

In another embodiment, elongated handle 2 can be solid or hollow and made of wood, metal plastic, carbon fiber or fiberglass. Scoop 3 is made of wire mesh in an integral basket configuration. Scoop 3 now comprises a notch 19 made of welded wire 19*a*. Alternatively, bag handles 20*aa*, 20*bb* loop through wire mesh of scoop 3. Wire meshes scoop 3 attaches to elongated handle 2 with wood dowel 47 and wood screws 15 at elongated handle lower opening 2*d*. Mesh scoop 3 attaches to handle length extension 2*aa* in other embodiments.

Portable Animal Waste Remover 1 with Stepped Scoop 3

Figure 4A:
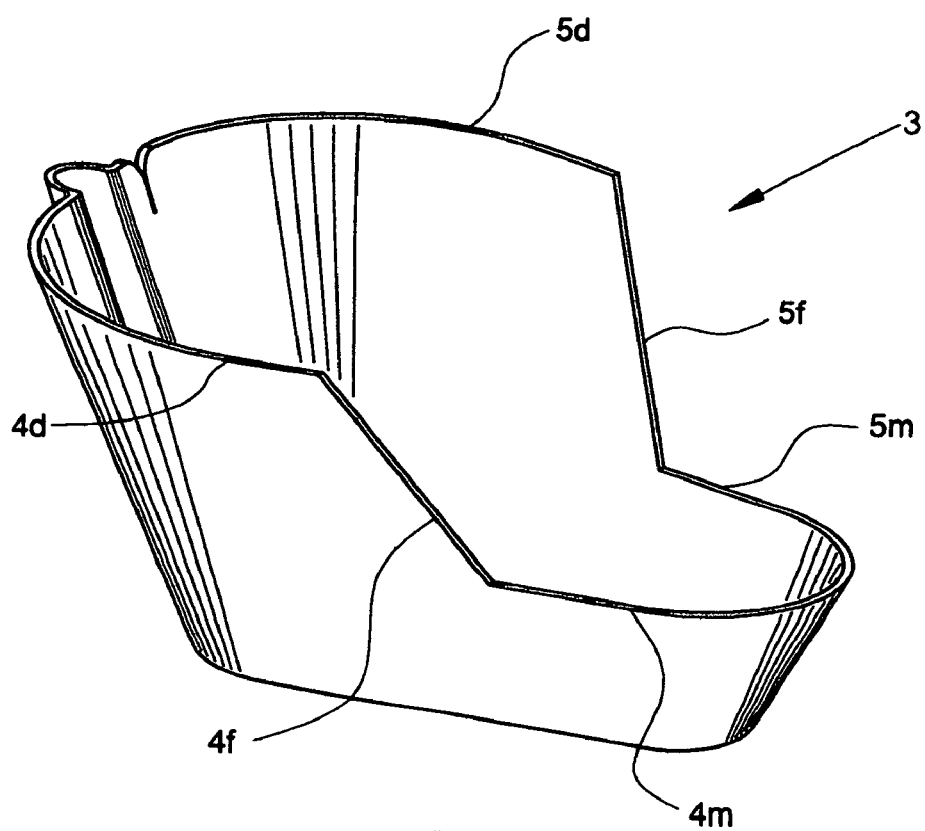
FIG. 4A illustrates an isolated view of a stepped scoop embodiment.
Figure 4B:
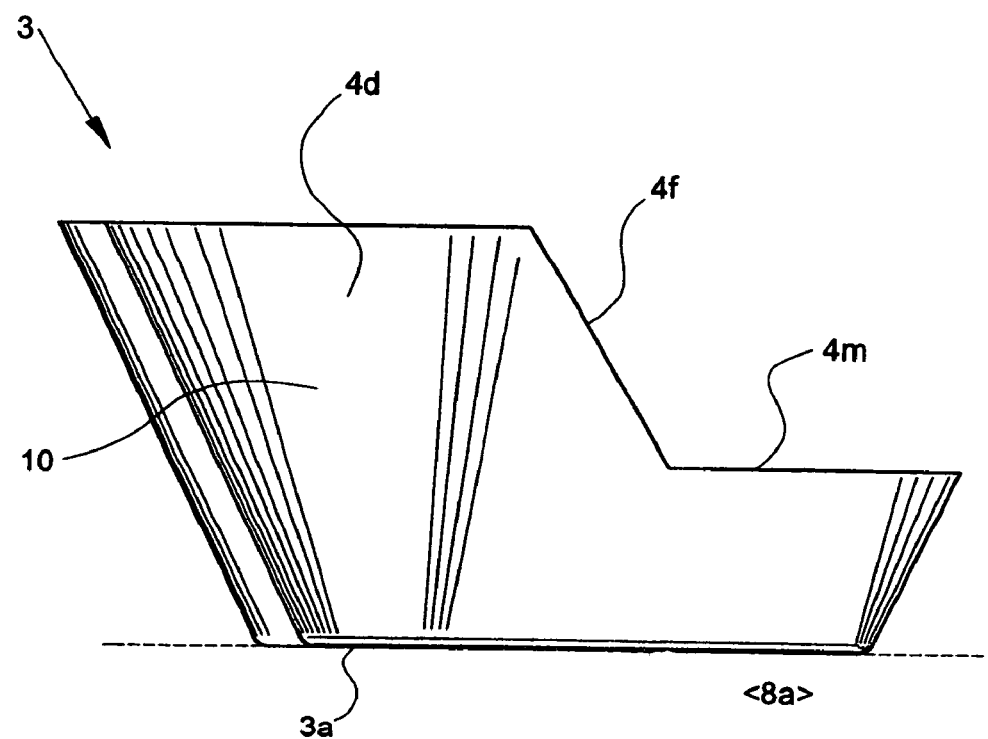
FIG. 4B illustrates an isolated lateral view of the FIG. 4A embodiment.

Referring now to FIGS. 4A and 4B, scoop 3 has a stepped configuration. With this embodiment, the user tips scoop 3 in a posterior direction for larger animals, but maintains scoop 3 flush with a horizontal surface 8*a* for a smaller animal. Scoop 3 comprises first and second upper stepped lateral edges 4*d*, 5*d* and third and fourth lower tapered stepped edges 4*m*, 5*m* respectively.

Still referring to FIGS. 4A and 4B, first and second inclined edges 4*f*, 5*f* respectively integrally connect stepped edges 4*d*, 4*m*, and edges 5*d*, 5*m* respectively. Third and fourth lower stepped edges 4*m*, 5*m* are tapered and easily slide beneath and between a smaller animal's hind legs. Lateral upper stepped sides 4*d*, 5*d* slide between the hind legs of a larger animal, while lower tapered stepped sides 4*m*, 5*m* lie towards the larger animal's anterior where they do not interfere.

Portable Animal Waste Remover 1 with Wheels 90

Figure 5:
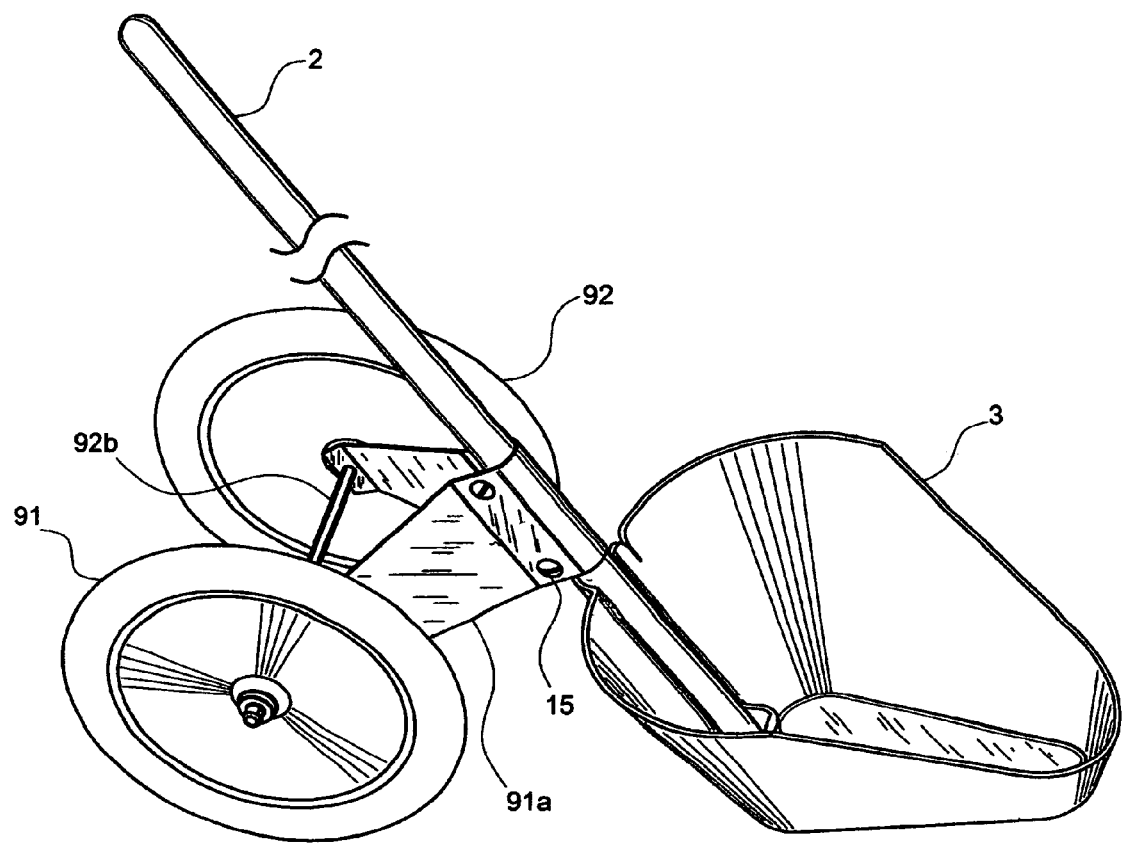
FIG. 5 illustrates a portable animal waste remover with wheels.

Referring now to FIG. 5, in another embodiment portable animal waste remover 1 is mobile. Elongated handle 2 is made of wood, metal or plastic. First and second large wheels 91 are preferably made of plastic, wood or polycarbonate, and large wheels 91 are available at hardware stores. Each wheel 91 is approximately 8.5 inches in diameter. Wheel brackets 91*a* are made of sheet metal or molded plastic, and wheel brackets 91*a* attach to elongated handle 2 with wheel screws 15. Axle 92*b* is preferably made of a cold rolled steel rod. Although FIG. 5 illustrates a preferred embodiment of scoop 3, other embodiments of scoop 3 are also within the scope of this invention.

Method of Producing Portable Animal Waste Remover 1 with Wood Mold

Figure 6:
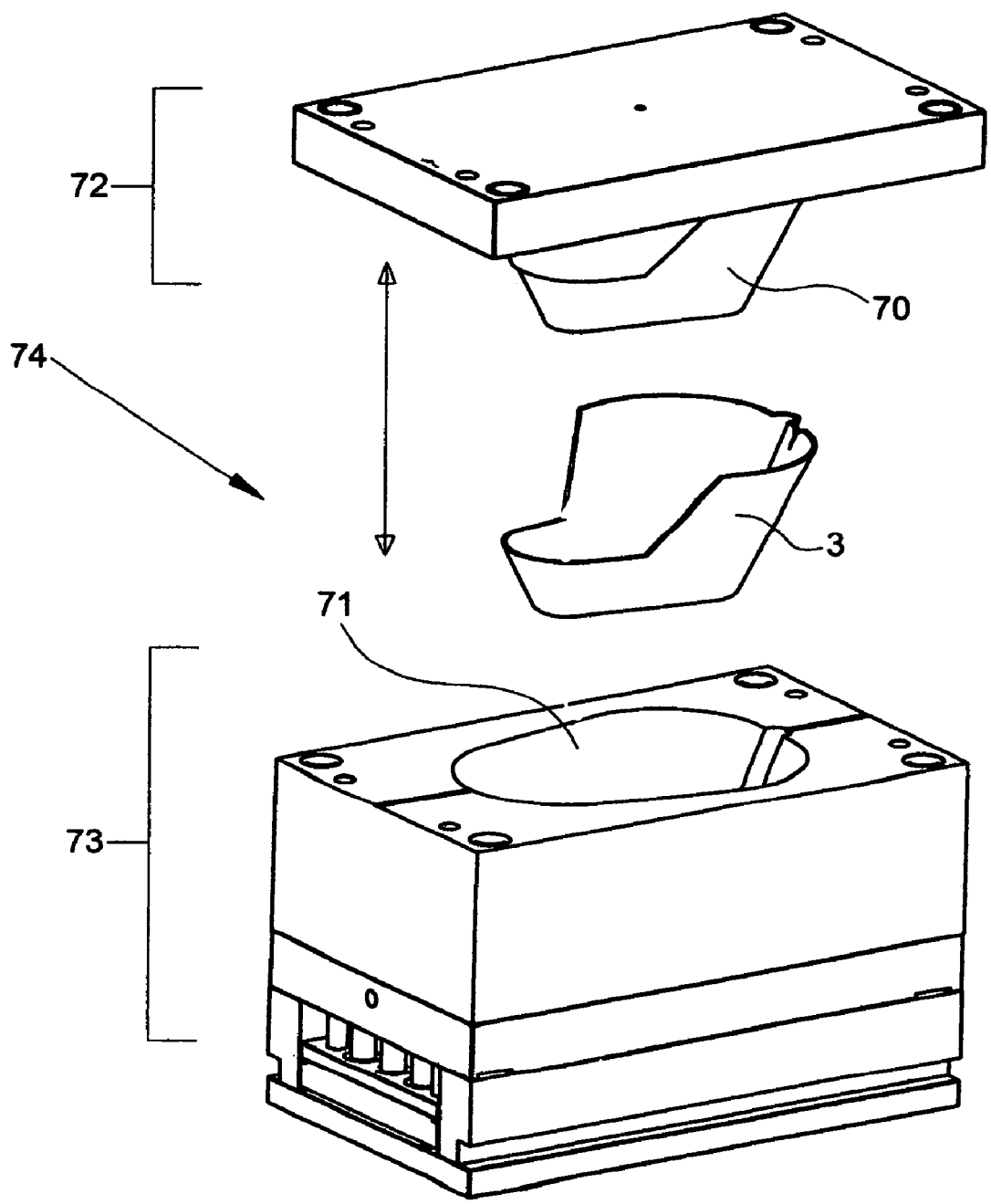
FIG. 6 illustrates a partial anterior view of the mold components in which the scoop portion of the invention is produced.

Referring to FIG. 6, the preferred method of producing portable animal waste remover 1 is injection molding which is a well-known art. This method comprises an upper mold component 72 with a male portion 70. There is also a lower mold component 73 with a depression 71 functioning as a female portion 71. Details of mold design, size and source of mold equipment in part determine time intervals, temperatures and pressures in a manner well known in this particular art.

In other embodiments the production method incorporates vacuum molding or extrusion molding in well-known applications of the art. In still other embodiments, scoop 3 is produced by metal stamping, deep drawn or electro-magnetics. Another method for producing scoops 3 is as follows:

The operator assembles a mold from several blocks which are preferably made of wood and shaped to conform to preselected contours of scoop 3. In particular, a separate handle block is added to create linear semi-circular indentation 12. The operator attaches the blocks to each other in the appropriate configuration with assembly screws and adhesive. He or she applies putty as needed to smooth the adjoining surfaces of each block.

The operator next stretches fiber glass cloth over the assembled mold and staples the fiber glass cloth to the mold's uppermost surface. He or she then applies a layer of epoxy glaze to the stretched fiber glass cloth and allows the resin to air-cure at room temperature. The cloth remains as a component of scoop 3 where it reinforces the resin so no polishing is necessary.

Use of Portable Animal Waste Remover 1 in the Best Mode

Referring initially to FIG. 7A, in the best mode the operator inserts curved scoop 3 into bag 20 while pulling a flexible container under scoop 3. Preferably the flexible container is a flexible bag 20 is made of plastic or another biodegradable disposable material. Flexible bag 20 can comprises a first handle 20*aa* and a second handle 20*bb*, or a first bag edge and a second bag edge.

The operator next wraps first bag handle 20*aa* around elongated handle 2 and pulls bag handles 20*aa* and 20*bb* through notch 19. Please see FIGS. 7B and 7C. The operator now slides scoop 3 under and between the pet's hind legs when the animal prepares to defecate. After the animal deposits waste into bag 20 lining curved scoop 3, the operator pulls the first bag handle 20*aa* (or the corresponding uppermost bag edge) from notch 19 and over elongated handle 2. He or she then pulls bag 20 in an anterior direction from under curved scoop 3. He or she pulls second bag handle 20*bb* (or the corresponding uppermost bag edge) from notch 19, thereby removing bag 20 from curved scoop 3. Handles 20*aa*, 20*bb* (or corresponding uppermost bag edges) are then tied together and the operator discards the enclosed waste.

This procedure immediately supra, completes the best mode of the invention. However, other methods and modes of using the portable animal waste remover 1 and a waste container are also within the scope of the invention.

The invention claimed is:

1. A portable animal waste removal device comprising
   A. a scoop comprising a first scoop lateral side, a second scoop lateral side, a curved posterior convex side and an anterior scoop side, said first scoop lateral side and said second scoop lateral side converging with said posterior convex side and said anterior scoop side, said device comprising upper sloping scoop side edges,
   B. said scoop lateral sides, said anterior scoop side, said posterior convex side and said upper sloping side scoop edges being structurally adapted to easily slide beneath the hindquarters of a defecating animal,
   said scoop comprising a sole and only notch within said posterior convex side, said sole and only notch adapted to reversibly retain a flexible container,
   C. a sole and only non-adjustable elongated handle, said elongated handle comprising a length, said elongated handle having an upper elongated end and a lower elongated end, said elongated handle attaching to said scoop at said lower elongated end, said lower elongated end attaching to said scoop at an angle, D. said scoop easily sliding beneath a defecating animal's hindquarters with said scoop simultaneously positioned between said animal's hind legs, said elongated handle not comprising a telescoping component, E. said device lacking wheels, said device being structurally adapted to fit between said hind legs, said elongated handle of a sufficient length to position said scoop between said hind legs and beneath said hindquarters whenever said upper elongated end is held by a person, said portable animal waste removal device further comprising a flexible container in combination therewith, said flexible container reversibly attaching to said portable animal waste remover through said sole and only notch.

2. A portable animal waste removal device comprising

A. a scoop comprising a first scoop lateral side, a second scoop lateral side, a curved posterior convex side and an anterior scoop side, said first scoop lateral side and said second scoop lateral side converging with said posterior convex side and said anterior scoop side, said device comprising upper sloping scoop side edges, B. said scoop lateral sides, said anterior scoop side, said posterior convex side and said upper sloping side scoop edges being structurally adapted to easily slide beneath the hindquarters of a defecating animal, said scoop comprising a sole and only notch within said posterior convex side, said sole and only notch adapted to reversibly retain a flexible container, C. a sole and only non-adjustable elongated handle, said elongated handle comprising a length, said elongated handle having an upper elongated end and a lower elongated end, said elongated handle attaching to said scoop at said lower elongated end, said lower elongated end attaching to said scoop at an angle, D. said scoop easily sliding beneath a defecating animal's hindquarters with said scoop simultaneously positioned between said animal's hind legs, said elongated handle not comprising a telescoping component, E. said device lacking wheels, said device being structurally adapted to fit between said hind legs, said elongated handle being of a sufficient length to position said scoop between said hind legs and beneath said hindquarters whenever said upper elongated end is held by a person, said portable animal waste removal device further comprising a sole and only scoop comprising wire mesh, said elongated handle consisting of the material selected from the group consisting of wood, metal, plastic, carbon fiber or fiberglass, said notch consisting of welded wire, said sole and only scoop attaching to said elongated handle with a wood dowel and wood screws.

3. A portable animal waste removal device comprising

A. scoop comprising a first scoop lateral side, a second scoop lateral side, a curved posterior convex side and an anterior scoop side, first scoop lateral side and said second scoop lateral side converging with said posterior convex side and said anterior scoop side, said device comprising upper sloping scoop side edges, B. said scoop lateral sides, said anterior scoop side, said posterior convex side and said upper sloping side scoop edges being structurally adapted to easily slide beneath the hindquarters of a defecating animal, said scoop comprising a sole and only notch within said posterior convex side, said sole and only notch adapted to reversibly retain a flexible container, C. a sole and only non-adjustable elongated handle, said elongated handle comprising a length, said elongated handle having an upper elongated end and a lower elongated end, said elongated handle attaching to said scoop at said lower elongated end, said lower elongated end attaching to said scoop at an angle, D. said scoop easily sliding beneath a defecating animal's hindquarters with said scoop simultaneously positioned between said animal's hind legs, said elongated handle not comprising a telescoping component, E. said device lacking wheels, said device being structurally adapted to fit between said hind legs, said elongated handle being of a sufficient length to position said scoop between said hind legs and beneath said hindquarters whenever said upper elongated end is held by a person, said portable animal waste removal device comprising a sole and only scoop, said sole and only scoop comprising a triangular lowermost scoop floor, said lowermost scoop floor comprising an upper flat surface and a lower flat surface.

4. A portable animal waste remover consisting of:

A. a scoop
said scoop being approximately 3/32 inch in thickness, said scoop having a length and a width, said width having a greatest posterior width, said length being approximately ten inches, said width being approximately nine and one-quarter inches at said greatest posterior width, said scoop consisting of a posterior convex curved scoop side and a narrow anterior scoop side, said posterior convex curved scoop side having a maximum depth, said maximum depth being approximately five inches at said posterior convex curved scoop side, said scoop having a maximum depth of approximately one and one-half inches at said anterior scoop side, said scoop consisting of a first lateral scoop side with a first sloping upper edge, said scoop consisting of a second lateral scoop side with a second sloping upper edge, said posterior convex curved scoop side having an upper posterior convex curved scoop side edge, said scoop consisting of a lowermost scoop floor, said lowermost scoop floor being roughly triangular, said lowermost scoop floor having a flat upper surface and a flat lower floor surface, said first and second sloping upper side edges converging with said upper posterior convex curved scoop side edge at an arc of approximately 35 degrees, said scoop further consisting of a scoop interior surface, said scoop consisting of a sole and only notch within said uppermost posterior side edge, said scoop consisting of a scoop posterior side center, said sole and only notch being approximately three-quarters inch in depth, said notch located approximately one inch from said scoop posterior side center, said scoop further consisting of a circular female part, said circular female part located along said scoop interior surface, said scoop further consisting of an interior semi-cylindrical indentation within said scoop interior surface, B. a sole and only elongated handle,
said sole and only elongated handle consisting of wood, said sole and only elongated handle consisting of a handle lower end, said lower handle end attaching to said curved scoop posterior side at the approximate center of said upper posterior side edge along said scoop interior surface approximately seven inches of said lower elongated handle end inserting into said semi-cylindrical indentation of said scoop interior surface, said lower elongated handle end further inserting within said circular female part, said elongated handle adhering with said semi-cylindrical indentation and attaching to said semi-cylindrical indentation with assembly screws, said elongated handle being cylindrical in shape, said scoop consisting of molded resin, said molded resin consisting of a black polybutylene terephthalate alloy containing approximately 20% fiberglass, said scoop being structurally adapted to easily slide beneath the hindquarters of an animal and simultaneously fit between the hind legs of said animal.

\* \* \* \* \*